United States Patent [19]
Aine

[11] 3,980,541

[45] Sept. 14, 1976

[54] ELECTRODE STRUCTURES FOR ELECTRIC TREATMENT OF FLUIDS AND FILTERS USING SAME

[76] Inventor: Harry E. Aine, 1804 Stierlin Road, Mountain View, Calif. 94043

[22] Filed: May 6, 1971

[21] Appl. No.: 140,937

Related U.S. Application Data

[63] Continuation-in-part of Ser. No. 643,489, June 5, 1967, abandoned.

[52] U.S. Cl. ............................ 204/186; 204/290 R; 204/302
[51] Int. Cl.² ..................... B03C 5/00; B01D 13/02
[58] Field of Search ............... 204/280, 290 R, 302, 204/186, 188, 284

[56] References Cited
UNITED STATES PATENTS

| | | | |
|---|---|---|---|
| 647,334 | 4/1900 | Shuman | 204/9 |
| 1,373,273 | 3/1921 | Tainton | 204/290 R |
| 2,573,967 | 11/1951 | Hamlin | 204/188 |
| 2,588,111 | 3/1952 | Hanneman | 204/290 |
| 2,816,067 | 12/1957 | Keidel | 204/130 |
| 3,117,920 | 1/1964 | Stenzel | 204/302 |
| 3,252,885 | 5/1966 | Griswold | 204/302 |
| 3,324,026 | 6/1967 | Waterman et al. | 204/302 |
| 3,445,376 | 5/1969 | Stenzel | 204/302 |

*Primary Examiner*—T. M. Tufariello
*Attorney, Agent, or Firm*—Lowhurst & Aine

[57] ABSTRACT

Composite electrode structures are disclosed employing mutually opposed electrodes spaced apart to define a fluid treatment region through which a fluid is passed for treatment by an electric field established between the electrodes. Resistive electrodes serve to localize the effect of electrical shorts between the electrodes. Refractory electrodes and insulators permit operation in high temperature environments. Non-uniform sheet and/or filamentary electrodes are disclosed for producing a substantial non-uniformity in the electric field within the treatment region for producing forces on particles having no net charge. A floating electrode between driven electrodes allows formation of an induced electric field in the treatment region while reducing the possibility of electrical shorts. Paper electrodes and paper insulators permit fabrication of an inexpensive electrode structure. Moisture is removed from the treated fluid by loading either or both the insulator and electric structures with a hygroscopic electrolyte and passing a current through the electrolyte to convert the moisture into elemental oxygen and hydrogen.

44 Claims, 53 Drawing Figures

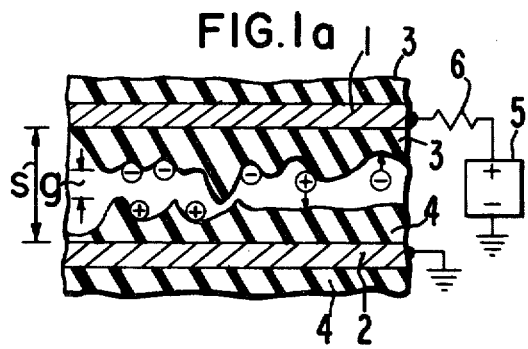
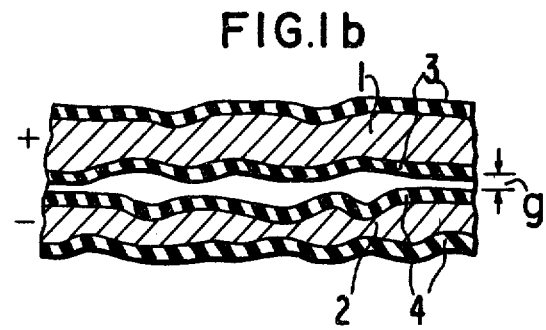
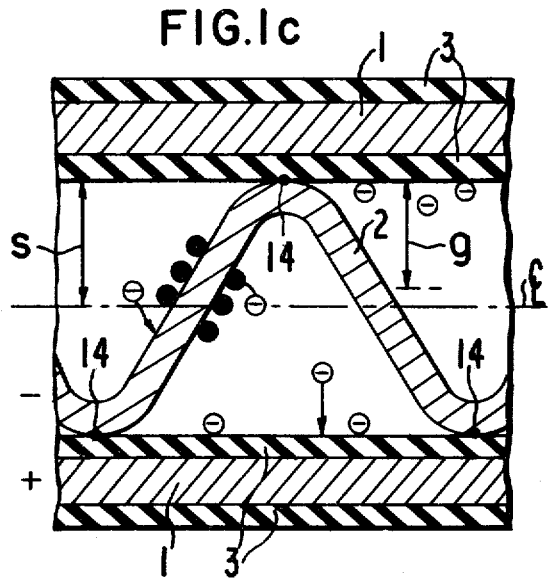
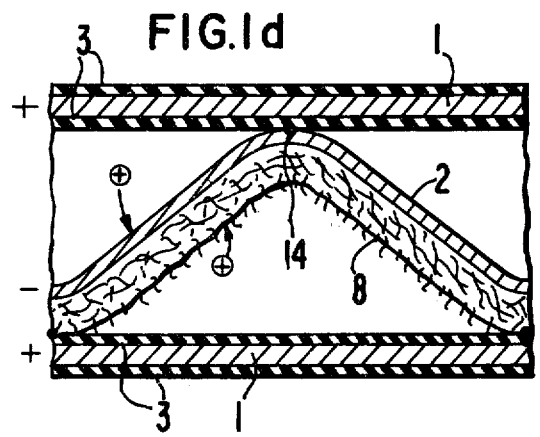
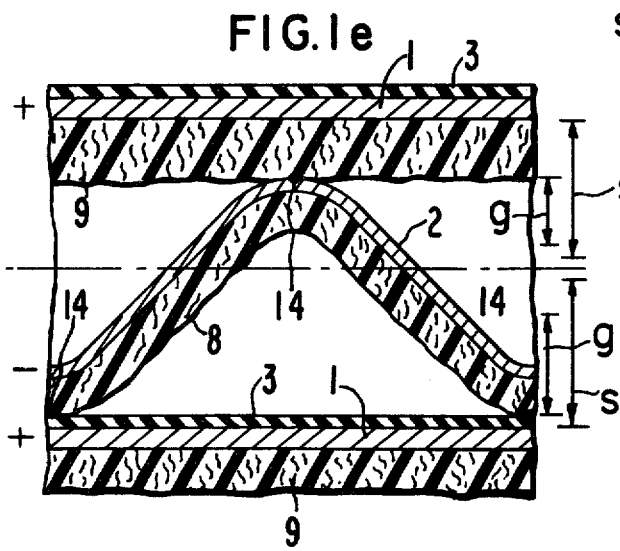
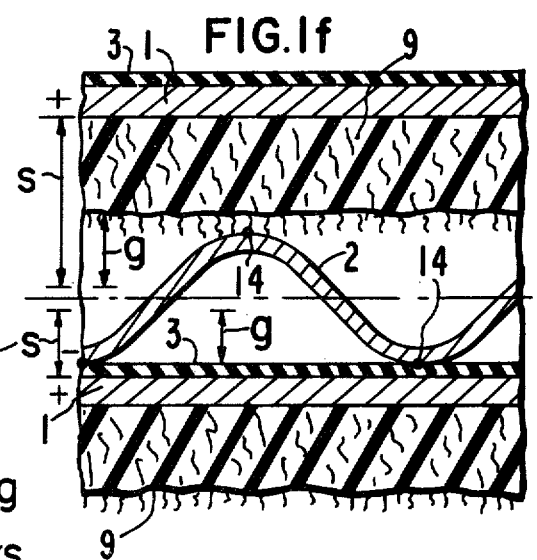

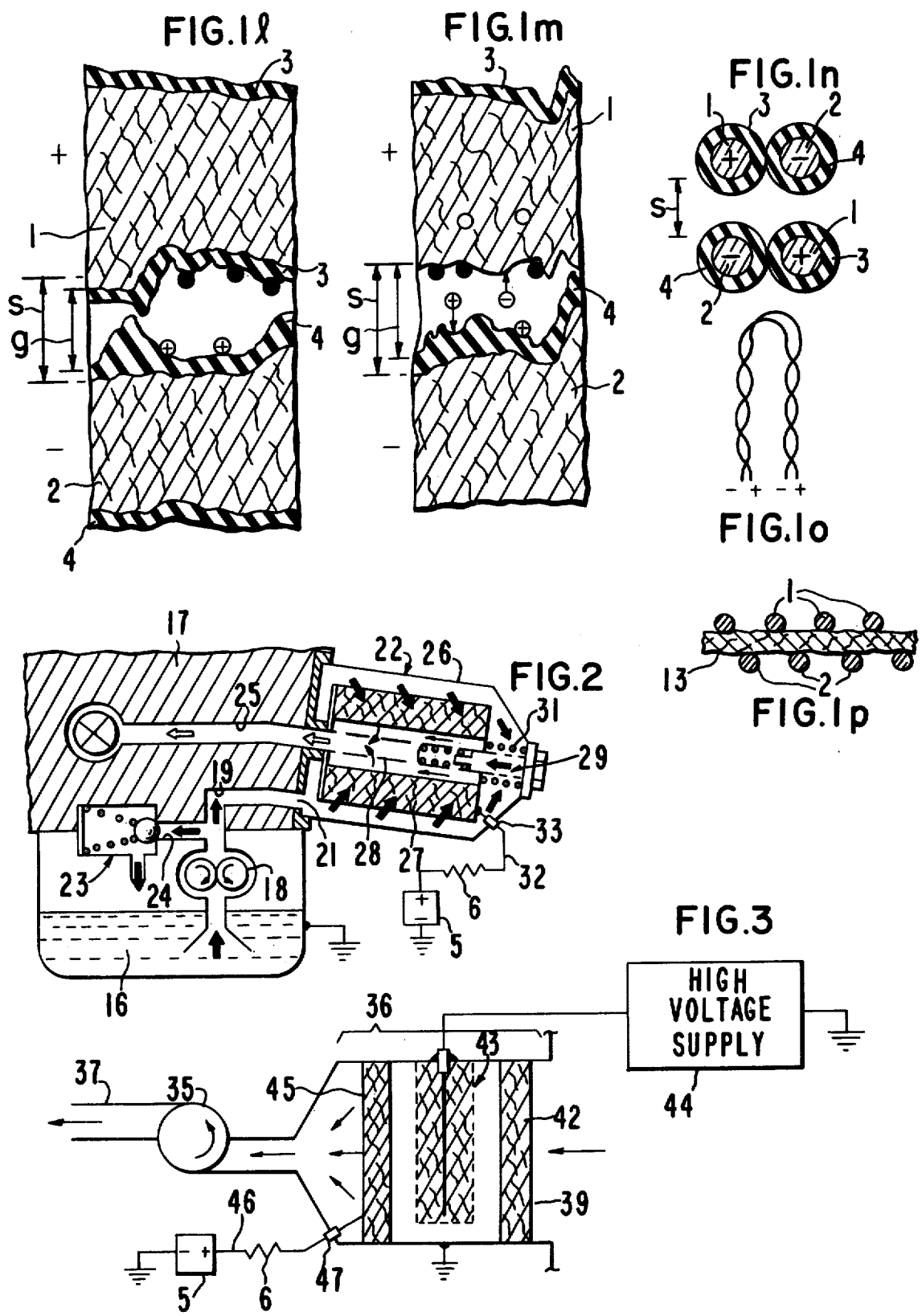

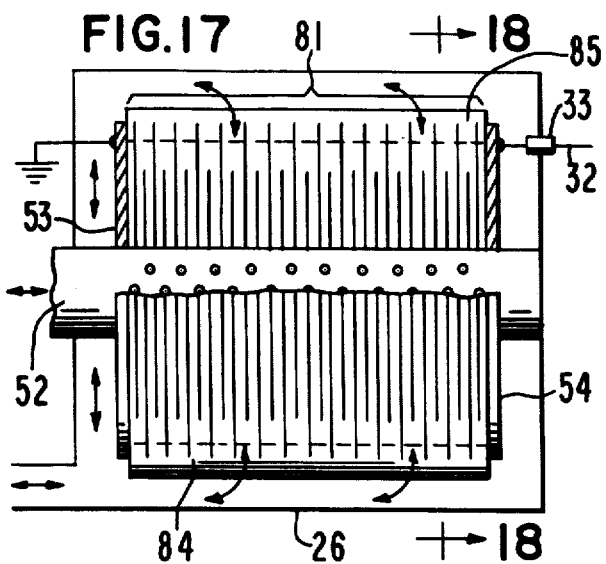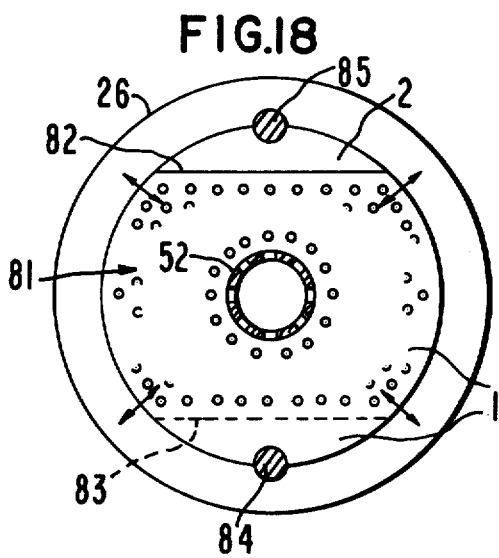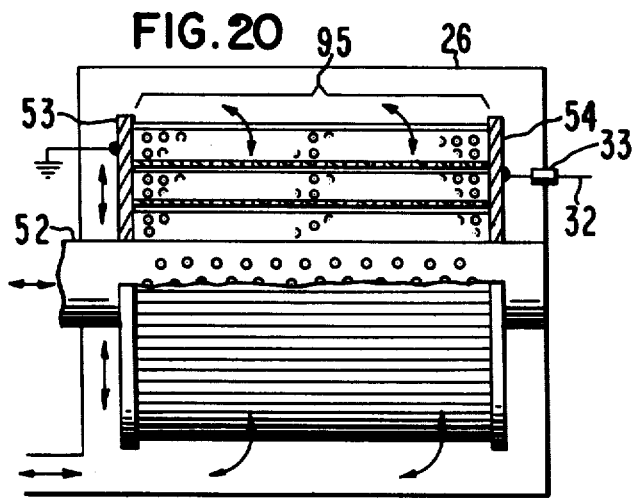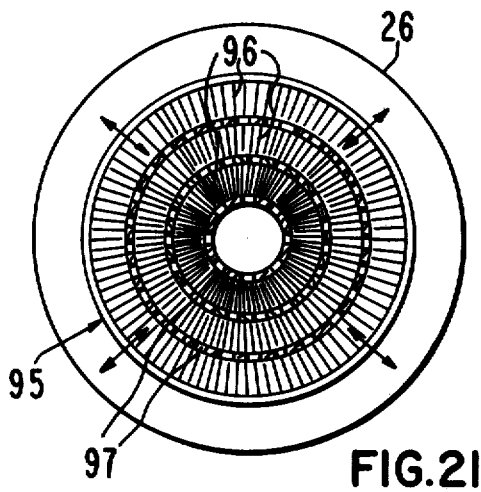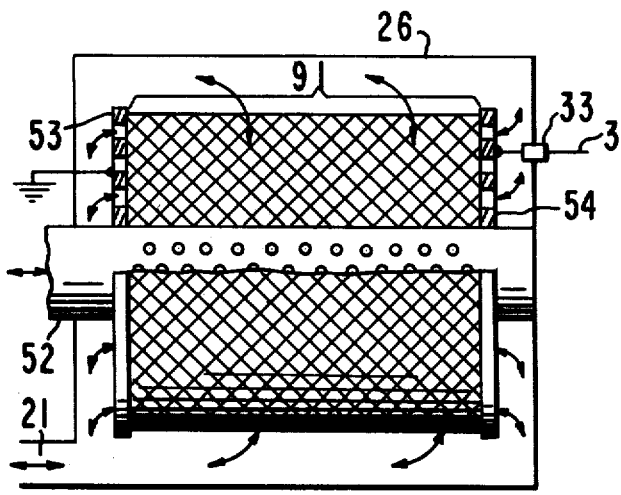

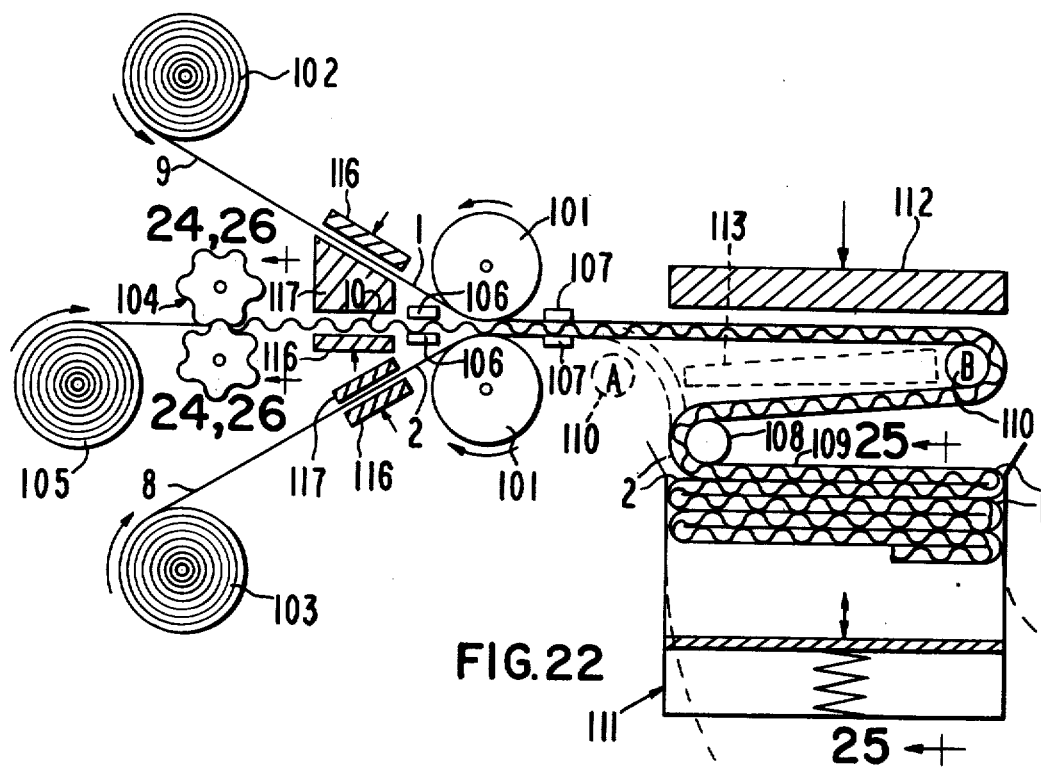
FIG.22
FIG.23
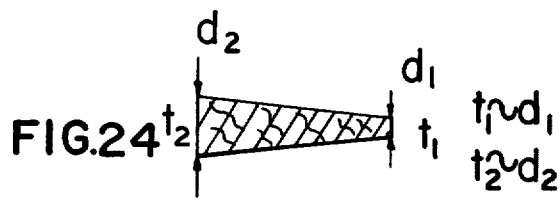
FIG.24  $t_1 \sim d_1$  $t_2 \sim d_2$
FIG.26
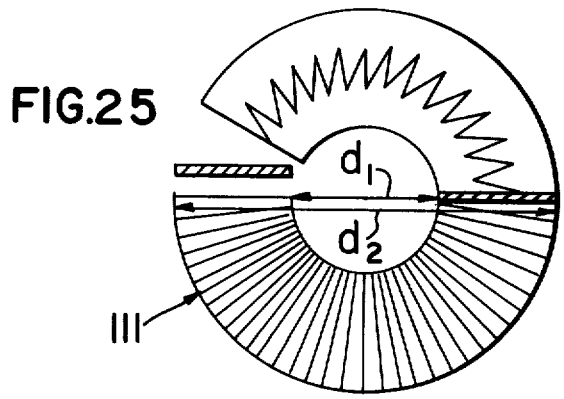
FIG.25

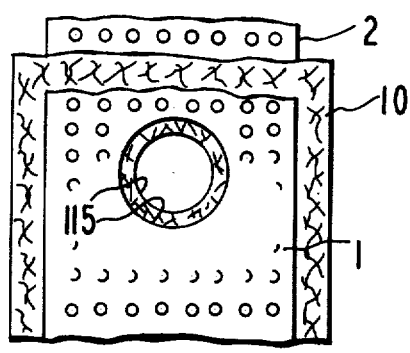
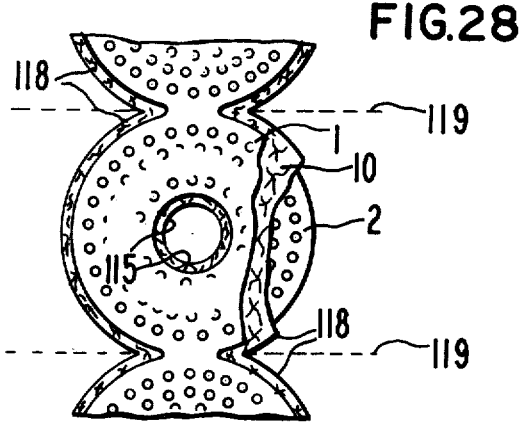
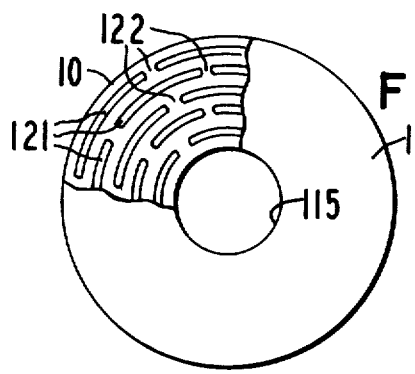
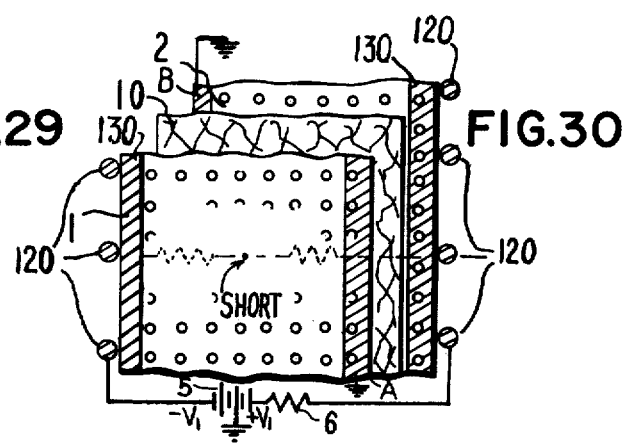
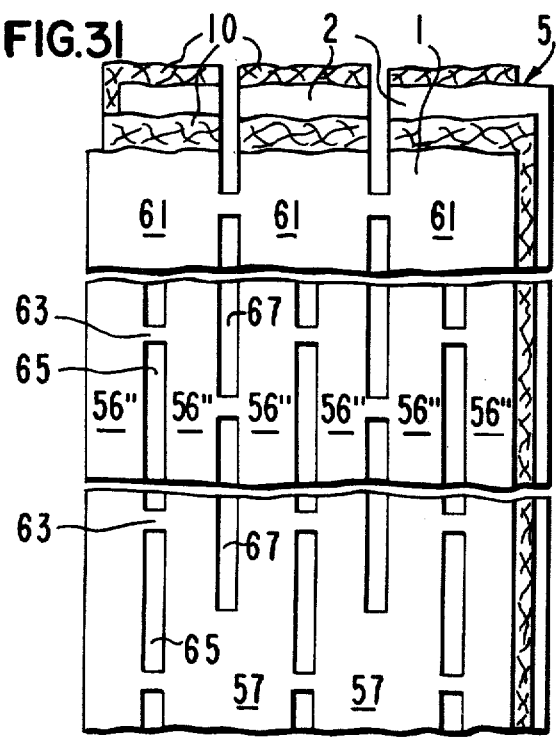
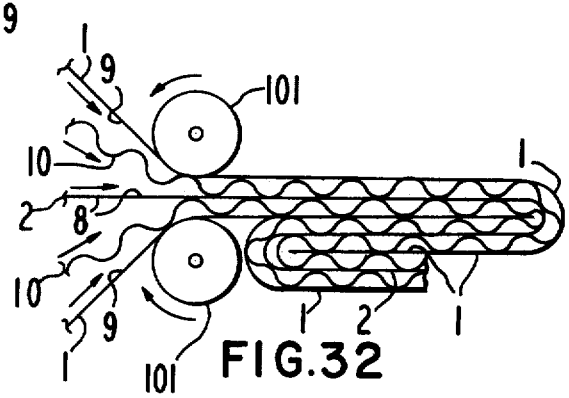

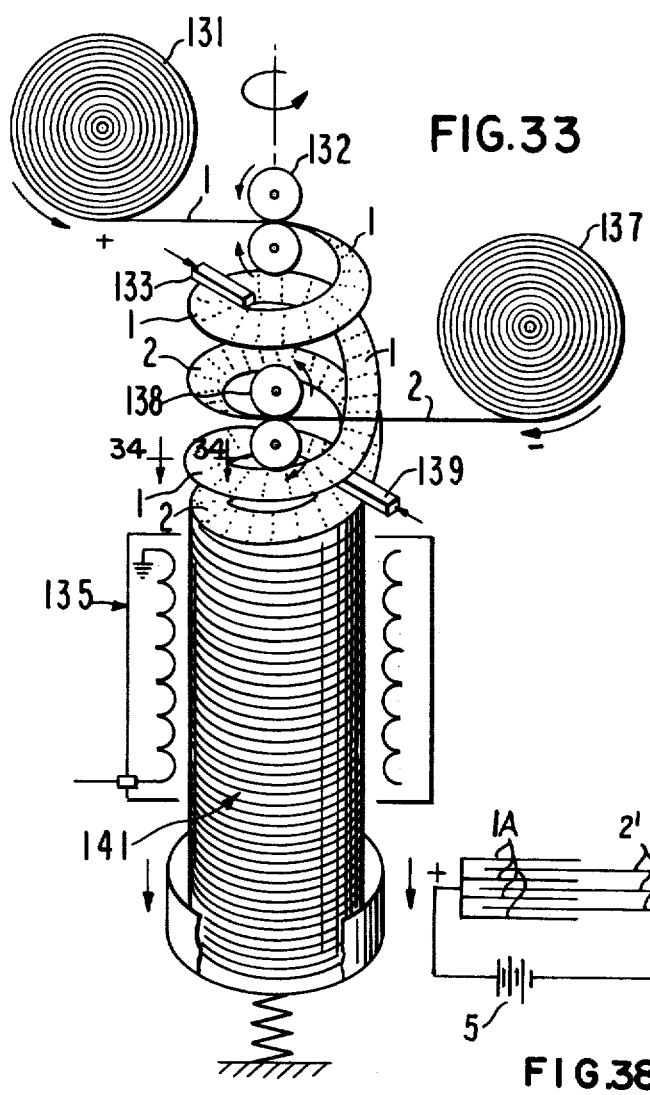
FIG.33
FIG.34
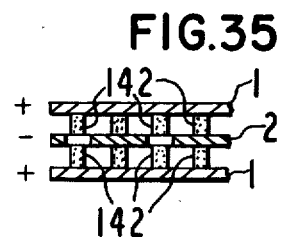
FIG.35
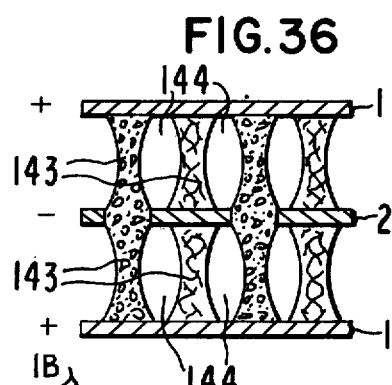
FIG.36
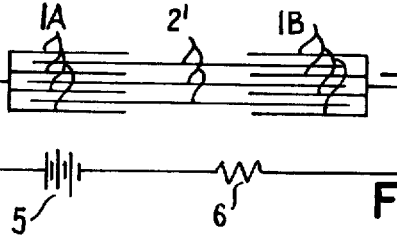
FIG.37
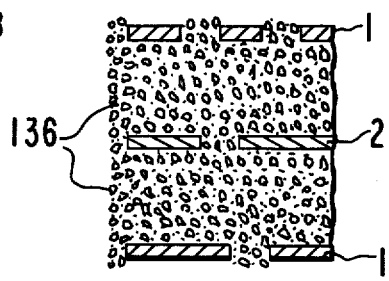
FIG.38
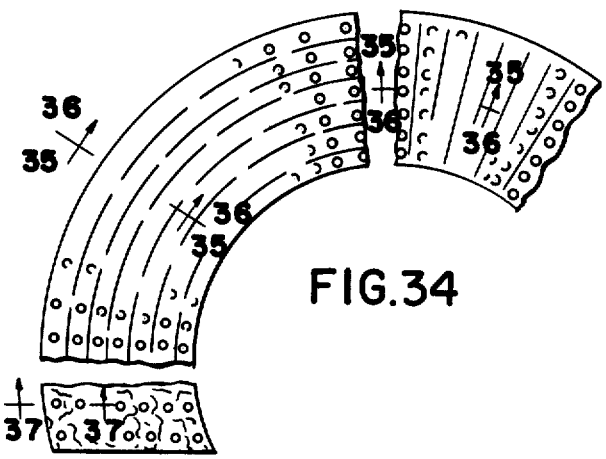

ELECTRODE STRUCTURES FOR ELECTRIC TREATMENT OF FLUIDS AND FILTERS USING SAME

RELATED CASES

The present application is a continuation-in-part application of parent application U.S. Ser. No. 643,489 filed June 5, 1967, now abandoned.

DESCRIPTION OF THE PRIOR ART

Heretofore, electrofilters have been proposed wherein a pair of aluminum foils were wound into a double spiral separated by an open cell foam insulator. Such a filter structure is disclosed in U.S. Pat. No. 3,445,376 issued May 20, 1969. While such a filter is suitable for relatively low fluid flow rates it is desirable to provide an electrofilter having an improved efficiency and flow rate with reduced manufacturing costs. In addition, such a prior filter has the disadvantage that an electrical short anywhere in the filter disables the electrical filtering action of the filter.

In other prior art, it has been found that the electrical filtering action of an electrofilter is enhanced by rendering the electric filed non-uniform in the electrical field filtering region. In one such prior art electrofilter, one of the electrodes of the filter is provided with a plurality of electric field discharge points to produce gradients in the electric field intensity E. Such an electrofilter is disclosed in U.S. Pat. No. 3,368,963 issued Feb. 13, 1968.

However, one problem with this prior type of electrofilter is that the filter structure is relatively complex and therefore relatively expensive to fabricate and clean.

SUMMARY OF THE PRESENT INVENTION

The principal object of the present invention is the provision of improved electrode structures for electric treatment of dielectric fluids and improved filters using same.

One feature of the present invention is the provision of a resistive means incorporated in at last one of the electrodes of the composite electrode structure in such a manner that an electrical short between the electrodes of the electrode structure in the treatment region serves to drop the applied potential across the resistive means in a localized portion of the electrode structure such that less than 1/10 of the treatment region is effectively shorted by said electrical short.

Another feature of the present invention is the same as the preceding feature wherein contactor electrode means are provided on opposite sides of the composite electrode structure such that a short between the electrodes causes the shorting current to flow from one contactor electrode means to the other contactor electrode means through said resistive electrodes.

Another feature of the present invention is the same as any one or more of the preceding features wherein a strip of electrically conductive material is coated onto the sheet shape resistive electrodes to render the coated strip portion of the electrode more electrically conductive than the remainder of the electrode to facilitate making of electrical contact to said sheet shape electrodes.

In another feature of the present invention a floating electrode is interposed between first and second electrodes in spaced relation to define a fluid treating passageway between the floating electrode and the pair of driven electrodes, such floating electrode being disposed in electrically insulative and in charge inducing relationship between the first and second electrodes to produce an electrical treating field in the fluid passageway between the floating electrode and the first and second electrodes, whereby electrical shorts between the first and second electrodes are inhibited in use.

Another feature of the present invention is the same as the preceding feature wherein the floating electrode includes a plurality of floating electrode portions electrically isolated from each other, whereby shorting between the electrodes is even further inhibited.

In another feature of the present invention one of the electrodes of a composite electrical treatment electrode structure is made of a porous web of electrically conductive material, whereby entrapment of particulate contaminates in the porous electrode structure is facilitated.

Another feature of the present invention is the same as the preceding feature wherein the porous web of electrically conductive material comprises a porous web of conductive fibers such as conductive paper, whereby an extremely inexpensive expendable filter structure is obtained.

In another feature of the present invention, a composite electrode structure for an electrofilter apparatus comprises a pair of sheet electrodes spaced from each other in insulative relation by means of a sheet of insulative material interposed between the first and second electrodes and wherein one of the electrode sheets is electrically non-uniform such as to produce a substantial non-uniformity in the electrical field intensity established between the electrodes in the filter treatment region, whereby particles containing a dipole charge distribution therein are attracted from the fluid stream.

Another feature of the present invention is the same as the preceding feature wherein the electrical non-uniformity in the sheet shape electrode comprises a substantial variation in the spacing between the mutually opposed broadsides of the first and second electrodes, whereby substantial non-uniformity in the electric field intensity is produced in the electrode filter.

Another feature of the present invention is the same as either one of the preceding features wherein the electrical non-uniformity or discontinuity of the electrode structure which produces the non-uniform field comprises a perforated pattern in the electrode structure.

In another feature of the present invention the composite electrode structure for electrical treatment of the fluid comprises first and second filamentry conductive electrodes interlaced to define an electrical treating region through which the fluid stream is to pass in between the filamentary electrodes.

In another feature of the present invention, a hygroscopic electrolyte is incorporated either into the electrodes or the insulator or both the electrodes and the insulator of an electrofilter for removing moisture from the fluid being treated, such moisture being hydrolyzed and liberated as oxygen and hydrogen which is then carried away by the fluid stream, thereby drying the fluid stream.

Other features and advantages of the present invention will become apparent upon a perusal of the following specification taken in connection with the accompanying drawings wherein:

BRIEF DESCRIPTION OF THE DRAWINGS

FIG. 2 is a schematic sectional view of a typical automotive oil system incorporating an oil filter of the present invention, FIG. 3 is a schematic sectional view of a typical air filter system incorporating features of the present invention, FIGS. 4 – 21 depict alternative composite electrode structures incorporating features of the present invention, FIG. 22 is a schematic view of a machine for folding electrode structures of the present invention, FIGS. 23 – 26 are sectional views of portions of the structure of FIG. 22 taken along their respective sectional lines, FIS. 27 – 31 are plan views of alternative electrode structures, FIG. 32 is a sectional view of an alternative method and apparatus for folding electrode structures of the present invention, FIG. 33 is a schematic view, partly in perspective, of an apparatus for fabricating two conductor helical electrode structures of FIG. 4, FIG. 34 is an enlarged fragmentary view of a portion of the structure of FIG. 33 taken in the direction of the arrows 34—34 and showing alternative patterns of foam coating, FIG. 35 is an enlarged sectional view of portions of the structure of FIG. 34 taken along line 35—35, FIGS. 36 and 37 are enlarged sectional views of the structure of FIG. 34 taken along lines 36—36 and 37—37, respectively, after expansion of the foam coating, and FIG. 38 is a schematic line diagram of an alternative composite electrode structure for treating fluid streams and incorporating a floating electrode structure.

DESCRIPTION OF THE PREFERRED EMBODIMENTS

Figure 1G:
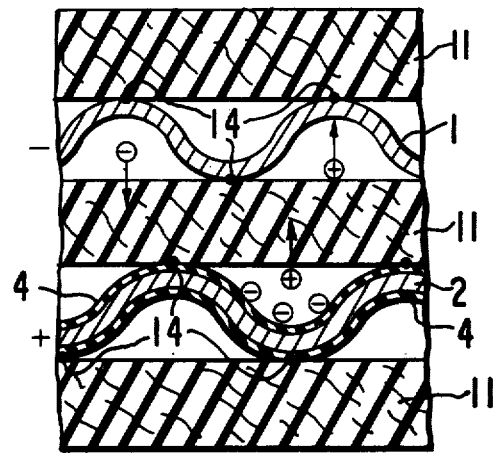
FIGS. 1(a) – 1(p) depict various alternative electrode structures for electric treatment of fluid streams.

Referring now to FIG. 1(a) there is shown a fragmentary sectional view of a portion of a composite electrode structure of the present invention. The composite electrode structure, only partially shown in FIG. 1(a), includes a pair of strip electrical conductors 1 and 2 as of 0.00025 to 0.002 inch thick aluminum foil. An insulative layer or coating 3 and 4 is formed on both sides of each conductor 1 and 2. The insulative coating 3 and 4 may comprise an anodized layer of the aluminum foil or a suitable organic or organo-ceramic insulative coating. Suitable organic insulation includes acrylic resin (Lucite) or vinyl. The insulative coating may have a thickness from 1 micron to 125 microns depending upon the desired electric field strength to be produced in the fluid path or gap, $g$, between the electrodes 1 and 2 and the thickness of the electrodes 1 and 2. An anodized coating 3 or 4 has a dielectric breakdown strength of 40 volts/micron thickness of the coatings between the electrodes 1 and 2.

An electrical potential is applied across the electrodes 1 and 2 from a suitable voltage supply 5 via a current limiting resistor 6. With 10 volts applied across electrodes 1 and 2 and a 25 micron spacing, $s$, between electrodes 1 and 2, an electric field on the order of 10kv/in. is produced in the gap, $g$, between the opposed insulative coatings 3 and 4. This is a relatively strong electric field and will draw charged particulated contaminants to the opposed faces of the insulative coatings 3 and 4.

The insulative coatings preferably have relatively rough porous surfaces to provide the gap spacing, $g$, and to aid in holding the charged contaminants to the surfaces of the coatings 3 and 4. Anodized aluminum coatings are generally relatively rough and porous having a labyrinth of micron size pores.

In a preferred embodiment, the conductive electrodes 1 and 2 are as thin as possible and the insulative coatings 3 and 4 are as rough and as thin as possible to provide a large gap thickness to conductor plus insulation thickness ratio. The larger this ratio, and the shorter the fluid path length through the electrode structure, the higher the flow capacity of the treating electrode structure for a given fluid pressure drop therethrough.

Referring now to FIG. 1(b), there is shown an alternative electrode structure to that of FIG. 1(a) wherein the conductors 1 and 2 are etched or otherwise roughened to produce uneven opposed surfaces which are reproduced in the opposed surfaces of the insulative coatings 3 and 4. This uneven surface structure provides the required gap spacing $g$ between the electrodes 1 and 2. Both electrodes need not be coated with the insulative layers 3 and 4. If only one is coated on both sides, the other electrode may be bare on both sides.

Referring now to FIG. 1(c), there is shown an alternative electrode structure employing a bare corrugated electrode 2 positioned between coated planar electrodes 1. Charged particles attracted to the bare electrode 2 will be electrically neutralized and will coalesce with other neutralized particles to form conglomerates of sufficient size to be trapped in the layrinth of flow passages through the composite electrode structure, more fully described with regard to FIGS. 4–21.

Corrugation of the bare electrode 2 substantially increases the transparency of the electrode structure for fluid flow in the direction of the channels defined by the corrugations. The corrugations define an array of fluid channels which may be directed parallel to or transverse to the mean direction of fluid flow through the electrode structure. A particularly advantageous electrode structure of FIG. 1(c) employs 0.00025 inch aluminum foil for electrodes 1 and 2. The insulative coatings 3 are an organic insulation about 4 microns thick. In one example, the characteristic spacing $s$ is 50 microns with a characteristic gap spacing $g$ of 46 microns. The fluid channels should peferably be in excess of 0.2 inch long through the composite electrode structure.

Referring now to FIG. 1(d), there is shown an alternative electrode structure similar to that of FIG. 1(c) except that the corrugated conductor 2 is bonded to a porous web 8. In a typical example, the web 8 is a porous paper, as of 25 microns thick. The charged particles which are drawn to electrode 2, from the side containing the web, are mechanically trapped in the web 8 either before or after being neutralized by reaching the conductor electrode 2. A web 8 may also be bonded to the other side of electrode 2 to trap particles on both sides. The web 8 may be made of fibers or solidified open-cell foam.

Referring now to FIG. 1(e), there is shown an electrode structure similar to that of FIG. 1(d) except that a second porous fibrous web 9 is bonded to the planar electrode 1. The web 9 may be bonded to electrode 1 by a conductive adhesive such that charged particles drawn to the electrode 1 through the web 9 may be neutralized to promote their coalescence and to improve mechanical trapping in the web 9. However, if the trapped particles are conductive they may tend to short out the electrodes 1 and 2 via the particle loaded web 9. If shorting is encountered, an insulative adhesive coating may be disposed between the web 9 and the electrode 1 or electrode 2 may be coated with an insulative coating on both sides to prevent shorting out the electrodes 1 and 2.

Referring now to FIG. 1(f), there is shown an alternative electrode structure similar to that of FIG. 1(e) except that the corrugated electrode 2 does not include the porous web 8.

Referring now to FIG. 1(g), there is shown an alternative electrode structure wherein a porous fibrous web 11, as of 25 micron thick paper, is disposed between corrugated strip electrodes 1 and 2. The web 11 serves to mechanically trap particles which are drawn from the fluid stream by the electric field into the web 11. In addition, the web 11 will trap coalesced particles which have been neutralized at the bare electrode 1. Either one or both of the electrodes 1 and 2 may be coated with an insulative layer.

Figure 1H:
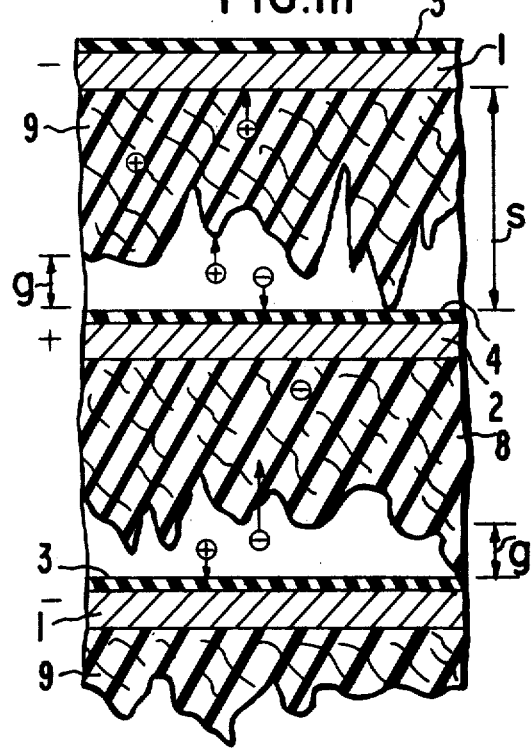

Referring now to FIG. 1(h), there is shown an alternative electrode structure similar to that of FIG. 1(e) except that the second electrode 2 is not corrugated. The roughness of the webs 8 and 9 provides, for example, about a 10 micron gap $g$ for the flow of fluid to be treated between the electrodes 1 and 2. The webs 8 and 9 also provide the spacing $s$ as of 25 to 40 microns between the electrodes 1 and 2.

Figure 1I:
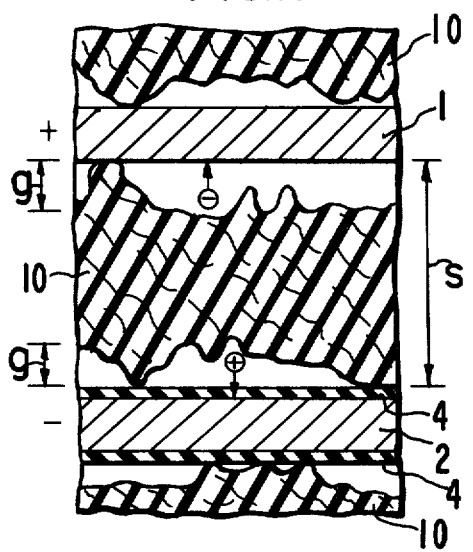

Referring now to FIG. 1(i), there is shown an alternative electrode structure to that of FIG. 1(h). The structure is essentially the same as that of FIG. 1(h) except that the web 10, as of 25 microns thick, porous paper, is not necessarily bonded to either one of the electrodes 1 or 2 before assembly of the composite electrode structure. The surface roughness of the web 10 provides a gap $g$, as of 10 microns wide, on both sides of the web 10 between the web 10 and the electrodes 1 and 2. One or both of the electrodes 1 and 2 may be coated with an insulative coating 3 or 4 as shown in FIG. 1(c). The web 10 provides the spacing between the electrodes 1 and 2 at, for example, 25 to 250 microns.

The web 10 may be made relatively thick as of 250 microns and extremely porous such that the fluid to be treated flows through the web 10 as well as through gaps $g$. In one embodiment, the fibers of the relatively thick web 10 are coated with a resin which may be of the thermosetting type. After the composite electrode structure is formed, the unit is heated to set the resin and bond the conductors 1 and 2 to the web 10 to produce a rigid porous self supporting structure. The twisting labyrinth of fluid channels formed by the porous web 10 serves to mechanically trap the relatively large non-charged particles, as of 20 microns and larger, whereas the smaller particles are typically charged and are precipitated from the fluid stream by the strong electric field between electrodes 1 and 2.

Figure 1J:
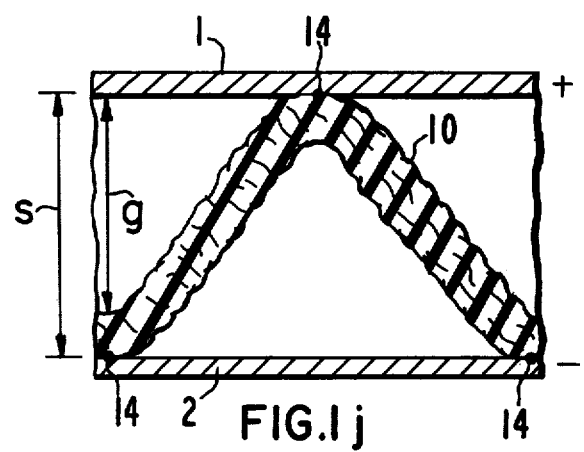
Figure 1K:
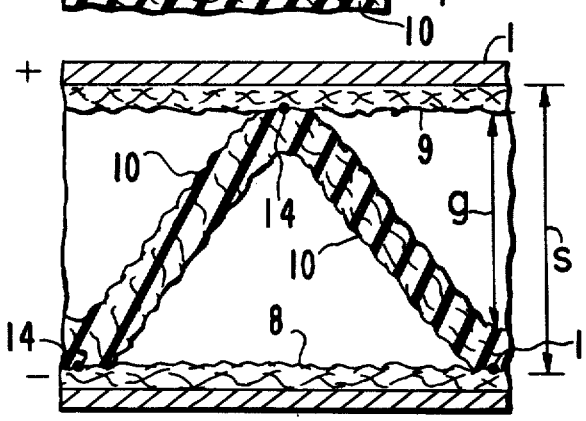

The web 10 may be corrugated to provide larger spacings $s$ and larger gaps $g$, see FIG. 1(j) and 1(k). The web 10 serves to mechanically trap charged particles pulled into the web 10 by the electric field between electrodes 1 and 2 and to trap neutralized coalesced particles carried along in the fluid stream between the electrodes 1 and 2. In the embodiment of FIG. 1(k) webs 8 and 9 also mechanically trap particles. The embodiments of FIGS. 1(j) and 1(k) are employed to advantage for high capacity flud flow due to their high transparency.

Referring now to FIG. 1(l), there is shown an alternative electrode structure similar to that shown in FIG. 1(b), except that the electrodes 1 and 2 are formed by a conductive web 12, as of conductive paper 25 microns thick. The conductive paper is coated with insulative coatings 3 and 4 as a acrylic resin (Lucite) 4 microns thick. The surface roughness of the electrodes 1 and 2 provides the characteristic spacing $s$ between electrodes 1 and 2 as of for example 30 microns. This same unevenness of the electrodes 1 and 2 also is reproduced between the insulative coatings 3 and 4 to define an average or characteristic fluid gap $g$ of about 20 microns.

Referring now to FIG. 1(m), there is shown an alternative electrode structure similar to that of FIG. 1(l) except that only one side of each electrode is coated with the insulative coatings 3 and 4. Alternatively, only one electrode could be coated on both sides with the insulative coating. In addition, one or both of the electrodes 1 and 2 may be corrugated as in FIGS. 1(c), (d), (e), (f), and (g) or a corrugated insulative web 10 could be employed between electrodes 1 and 2 as in FIGS. 1(j) and 1(k) to provide increased flow capacity for the composite electrode structure.

Electrically conductive papers or webs are available with a very wide range of conductivity or resistivity. For example, dielectrically coated conductive papers used in electrographics such as in electrophotography, electroprintings, and office copiers have a surface resistance variable from $1 \times 10^7$ $\Omega$/sq to $3 \times 10^8$ $\Omega$/sq at a relative humidity of 50%. This resistivity normally decreases by one order of magnitude for each increase of 15% in the relative humidity. Also, depending upon when and how the conductive material is incorporated into the paper, the resistivity is often quite different on opposite sides of the paper as well as in the center of the paper. For example, at 50% humidity one brand of conductive paper has a resistivity on the "wire" side of the paper of $2 \times 10^{11}$ $\Omega$/sq, whereas the "felt" side of the paper has a resistivity of $7 \times 10^7$ $\Omega$/sq, and the center portion of the paper has a bulk resistivity of $5 \times 10^{12}$ $\Omega$ cm. These types of conductive papers are normally coated with or impregnated with a conductive material, such as a conductive polymer, in the manner as disclosed in U.S. Pat. No. 3,011,918, or a metallic salt. Papers of the first type include those coated with Dow Chemical polymer CX-2611.34 and CX-2611.12. Conductive papers are commercially available from several sources including West Virginia Paper Co., Plastic Coating Corp., and Consolidated Paper Co. of Wisconsin Rapids, Wis.

Papers and other fibrous and open cell structures, such as solidified foams, are als rendered conductive by coating, or impregnating same with other types of conductive materials such as carbon, graphite, metals or certain metal oxides such as $SnO_2$.

In certain environments chemically stable and/or refractory electrodes and insulators are called for. For example, in treating or electrofiltering the hot exhaust gases of heaters, incinerators, etc., refractory electrodes and insulators are called for. Examples of refractory electrodes include, the refractory metals, carbon, graphite, carbon impregnated ceramics, such as carbonized alumina, as well as carbonized glass, asbestos and quartz, and high temperature conductive glass. High temperature conductive glasses may also be chemically stable. Such electrodes may be solid, open cell foam, or made of a fibrous web. Suitable webs include fibrous webs of glass, quartz, asbestos, etc. These webs may be used as refractory insulators and are rendered conductive to form electrodes by coating or impregnating same with a refractory conductive material, such as a refractory metal, carbon, or graphite.

Referring now to FIG. 1(n), there is shown an alternative electrode structure wherein the first and second conductive electrodes 1 and 2 are conductive filaments, as of 0.001 inch in diameter. Such filaments may comprise wire or conductive coated or impregnated filaments, such as carbon or conductive polymer impregnated string. One or both of the electrodes may be coated with an insulative layer, as of 4 microns thick. The characteristic spacing $s$ between electrodes 1 and 2 is preferably made less than 250 microns and is conveniently obtained by twisting the conductors 1 and 2 together in a bifilar form as shown in FIG. 1(o) or otherwise interlaced or intertwined. Alternatively, the electrodes 1 and 2 may be each formed by a wire screen and one or both of the wire screens may have its wires coated with an insulative layer. Referring now to FIG. 1(p), as employed in the electrode embodiment of FIG. 1(g), a fibrous web 13, as of 25 micron thick porous paper, is disposed between the electrodes 1 and 2 for mechanically trapping neutral particles. The web 13 may be disposed between adjacent layers of windings of the bifilar winding 1 and 2 or between adjacent layers of the wire screens as depicted in FIG. 1(p). The fluid flow through the composite filamentary electrode structure may be in any desired direction as the composite electrode structure includes a labyrinth of interconnecting fluid channels therethrough.

Referring now to FIGS. 1(a)-1(p), the electrode structures shown therein may be perforated to interconnect all of the fluid channels, defined by the spaces between adjacent electrodes 1 and 2, to produce a labyrinth of interconnecting fluid channels through the composite electrode structures. The perforations permit blocked channels to be bypassed thereby permitting a more complete utilization of the composite electrode structure for treatment of the fluid. The perforations may be any convenient size as of on the order of the spacing between electrodes such as 250 microns in diameter or less. The insulative webs 8–13 are preferably perforated in the same manner as the electrodes and for the same reasons. The perforations also serve to reduce the fluid pressure drop through the electrode structure and to increase the flow capacity of the structure for a given pressure drop.

Also, the various electrode structures of FIGS. 1(a)-1(p) may be bonded together by a relatively closely spaced pattern of adhesive spots or lines to form an integral rigid self-supporting composite electrode structure. If a line pattern of adhesive is employed, the lines, like the aforedescribed corrugations, may extend in or transversely to the mean direction of fluid flow through the composite electrode structure. The bonded electrode structure will also reduce the tendency of the composite structure to be distorted and channels widened, far beyond the designed dimensions, due to fluid channeling through the structure. In the electrode structures employing one or more corrugated elements, the adhesive lines are conveniently placed along the peak edges of the corrugated member, as depicted at 14 in FIGS. 1(c), (d), (e), (f), (g), (h), (j), and (k). In general, in all the embodiments of FIGS. 1(a)-1(p), the transparency of the composite electrode structure, to provide increased flow capacity, may be increased by corrugating one or both of the electrodes 1 and 2 and-/or the insulative web elements.

An inherent advantage to the composite electrode configurations of FIGS. 1(a), (b), (c), (d), (e), (f), (g), (l), (m), (n), and (p), especially for use in an electrofilter, is that the electrode sheets 1 and 2 are electrically non-uniform to produce a non-uniform electric field intensity $\nabla E$ in the fluid treatment region between the sheet electrodes 1 and 2. More particularly, the corrugated electrode configurations of FIGS. 1(a), (b), (c), (d), (e), (f), (g), (l) and (m) result in a non-uniform or variable spacing between the opposed electrodes which produce a substantial gradient in the electric field intensity $\nabla E$ within the treatment region. This gradient in the electric field $\nabla E$ becomes very substantial when the variation in the spacing between the sheet electrodes (peak-to-peak amplitude of the corrugations) is greater than one quarter of the mean spacing between the sheets 1 and 2.

The perforated pattern of the sheet screen electrodes 1 and 2 of FIG. 1(p), as well as the perforated pattern in the corrugated and non-corrugated composite electrode configurations, wherein the perforations have lateral dimensions in the plane of the sheet which are larger than about one quarter of the mean spacing between electrodes 1 and 2, also produces a substantial non-uniformity in the electric field within the fluid filtering region. The perforated pattern in the sheet electrodes is one way to obtain an interrupted, discontinuous or non-uniform electrode. As an alternative, such a pattern may be printed of a conductive material on an insulative sheet to obtain a non-uniform electrode to produce a non-uniform $E$.

The gradient in the electric field $E$ produces a force on particles having a dipole charge distribution. Such a charge distribution can be permanent or induced in the presence of the electric field. The electric field, of course, produces a force on particles having a net charge (monopole), such as ions. It is known that about 50% of the particles in air are monopoles and that the other 50% of the particles have either a permanent dipole charge distribution or will have a dipole charge distribution induced therein by an electric field.

The force equations are as follows:

$$\text{Force on a monopole} = F_1 = E_{k_0} = (Vq/S) \quad \text{Eq (1)}$$

where $E$ is the electric field intensity, $q$ is the charge on the monopole, $V$ is the electric potential, and $s$ is the spacing across which the electric field extends.

The force on a permanent dipole $$F_2 = \frac{\delta E}{\delta X}\mu \simeq \frac{V}{s^2}\mu \quad \text{Eq (2)}$$

where $\mu$ is permanent dipole moment, and $X$ is the distance in the direction of $s$.

The force on an induced dipole $$F_i = \epsilon \frac{\delta(E^2)}{\delta x} \qquad \text{Eq (3)}$$

where $\epsilon$ is $\epsilon o \epsilon r$ where $\epsilon o$ is the permittivity of free space and $\epsilon r$ is the relative permittivity of the medium in which the particle is immersed.

The dipole particles are forced in the direction of the highest intensity of the electric field, whereas the monopole particles are forced to the electrode of opposite electric sign. In the case of electrodes with insulative coatings, such coatings are preferably leaky insulators to permit neutralization of charge collected thereon while nevertheless keeping the flow of current between electrodes negligibly small. In addition, the electrodes are preferably made of a porous web material or are covered with a porous web such that particles collected on the electrodes are trapped thereon. This is particularly desirable in the case of ∇E producing electrode structures which pull particles with induced dipole charge distributions out of the fluid stream. When such induced dipole particles arrive at the corrugated or non-uniform electrode and are neutralized, they are repelled from the electrode due to the collected charge. However, a porous web electrode, such as those disclosed with regard to FIGS. 1(l) and 1(m), or a porous web covering the electrode, or adjacent the electrode, such as previously disclosed with regard to electrode 2 of FIG. 1(d), will tend to trap and hold the particles to the electrode.

Referring now to FIG. 2, there is shown a typical automotive oil system employing features of the present invention. An oil sump 16 is provided at the bottom of an engine block 17. Lubricating oil is drawn from the sump 16 by a pump 18 and fed via channel 19 to an input port 21 of the oil filter assembly 22. A pressure relief valve 23 is provided in a bypass channel 24 around the pump 18 to prevent the output oil pressure of the pump from exceeding some predetermined pressure. The filter assembly 22 filters the oil at a flow rate of about 2.5 gal./minute at 45 mph for the conventional automobile engine and up to 12 gal./minute for high performance engines. The filtered oil is fed via channel 25 to the bearings and other surfaces to be lubricated.

The filter assembly 22 includes a filter housing 26 sealed at one end to the block 17. The housing 26 is closed at its other end. A hollow cylindrical filter cannister 27 is contained within the housing 26. Oil to be filtered flows through a composite electrode structure, more fully described below, disposed within the cannister 27 wherein particulate contaminates are removed. The filtered oil exits from the electrode structure into a perforated tube 28 forming an extension of the channel 25. A pressure relief valve assembly 29 is provided in the outer end of the tube 28 in a bypass channel 31 around the end of the electrode structure for bypassing the electrode structure when the fluid pressure drop therethrough exceeds a predetermined pressure as of 7 psi.

One electrode of the electrode structure is connected to the grounded engine block 17 and the other electrode is connected via lead 32, insulative bushing 33 and current limiting resistor 6 to one terminal of the 12 volt battery 5. The various different composite electrode structures that may be employed to advantage in the filter cannister 27 are fully described below.

Referring now to FIG. 3, there is shown a typical air filtration system employing features of the present invention. Air to be filtered is drawn by an air blower 35 through an air filter assembly 36. The filtered air is exhausted at 37. The air filter assembly 36 includes a conduit 38 which is open at an inlet end 39 and connected to the blower 35 at its output end 41. A conventional mechanical filter element 42 removes relatively large particles from the inlet air stream, such particles being larger than a few microns in diameter. A conventional corona discharge assembly 43, supplied with high voltage from a voltage supply 44, charges the particulated matter which is carried by the air stream into the composite electrode structure 45. The composite electrode structure 45 removes the particles and passes the clean air to the blower 35. The relatively low operating voltage for the filter 45 is derived from battery 5 via lead 46, insulator bushing 47, and current limiting resistor 6. The filter element 45 may be employed in the planar geometry, as shown, or may take a hollow cylindrical form with the air flow passing radially through the annular electrode structure. Annular electrode geometries are described below with respect to FIGS. 4–21 but it is to be understood that these cylindrical geometries may be flattened or otherwise arranged to form planar geometries, if desired.

Referring now to FIGS. 4–21, a number of different composite electrode structures are shown for treating fluids. Each of the structures will be described in detail but it is to be understood that each of the composite electrode structures, to be described, is made up of two electrode structures, i.e., electrodes 1 and 2 plus their corresponding insulative member and coatings 3, 4, 8–13. The electrode structures take any one of, or combinations of two or more of, the geometries, as previously described herein with regard to FIGS. 1(a)–1(p).

Figure 4:
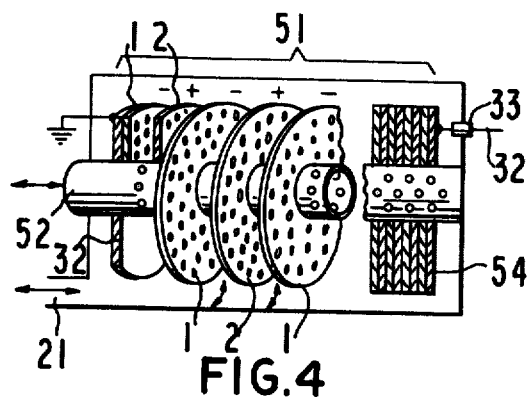

Referring now to FIG. 4, there is shown a double wound helix composite electrode structure 51 of the present invention. Electrodes 1 and 2, together with their insulative structures, are wound together in the form of bifilar helix 51 around a perforated tube 52. The helix structure 51 is shown expanded at the left end for the sake of explanation. The helix 51 is compressed from the ends between a pair of centrally apertured conductive disks 53 and 54. One of the disks 53 is connected to one of the electrodes 1 to form a terminal for the first electrode 1, whereas the other disk 54 is electrically connected to the other helical electrode 2, forming a terminal for the second electrode. The other two terminal ends of the helical electrodes 1 and 2 are insulatively terminated internally of and at opposite ends of the composite helix structure 51. Terminal 53 is grounded and the other terminal 54 is connected to the battery 5 via bushing 33 and lead 32.

Fluid to be treated such as oil or air to be filtered passes radially through the fluid channels, i.e., gaps $g$, defined between electrodes 1 and 2. The flow may be radially inward or radially outward of the helix structure 51, as desired. In an oil filter, the housing 26 is provided enclosing the electrode structure 51. In a air filter, the housing may be eliminated for many applications. Also, in an air filter, the helix structure would preferably have an inner diameter more nearly equal to its outside diameter in order to accommodate higher fluid flow capacity with less pressure drop. The helix structure 51 is preferably perforated, as previously described. In an oil filter, a conventional pressure relief valve 29 would also be provided but it is not shown in any of the FIGS. 4–21 in order to simplify the description.

Figure 5:
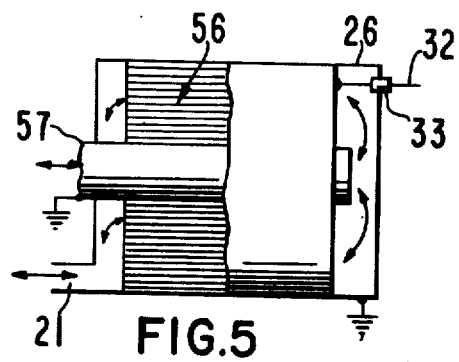
Figure 9:
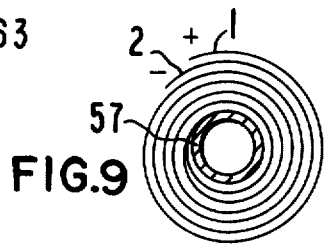

Referring now to FIG. 5, there is shown a double spiral composite electrode structure 56. The two electrodes 1 and 2, together with their corresponding insulative structures, are spirally wound around a hollow tube 57 in the manner as shown in FIG. 9. One of the electrodes 1 is connected to the central tube 57 which is grounded. The other electrode 2 is insulatively terminated near the inner diameter of the cylindrical spiral 56. The outer end of electrode 1 is terminated on the grounded housing 22. The outer end of the electrode 2 is insulatively terminated within the spiral and is connected to the battery 5 via bushing 33 and lead 32. Fluid to be treated flows axially through the spiral element 56 into an open end of tube 57 and back through the center of the electrode structure 56. Alternatively, the flow direction in all of FIGS. 4–21 may be reversed.

Figure 6:
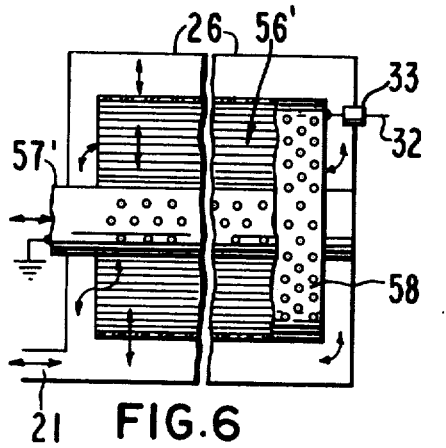

Referring now to FIG. 6, there is shown an alternative double spiral electrode structure similar to that of FIG. 5 except that the composite electrode structure 56' is wound over a perforated tube 57'. A perforated tube 58 surrounds the outer periphery of the spiral element. In addition, the housing 26 is spaced from the periphery of the element 56' to permit axial fluid flow into the spiral electrode structure 56' from both ends as well as radial flow through the perforated electrodes and insulative structure to the perforated inner tube 57'. This modification permits higher flow capacity than obtainable with a comparable structure 56 of FIG. 5.

Figure 7:
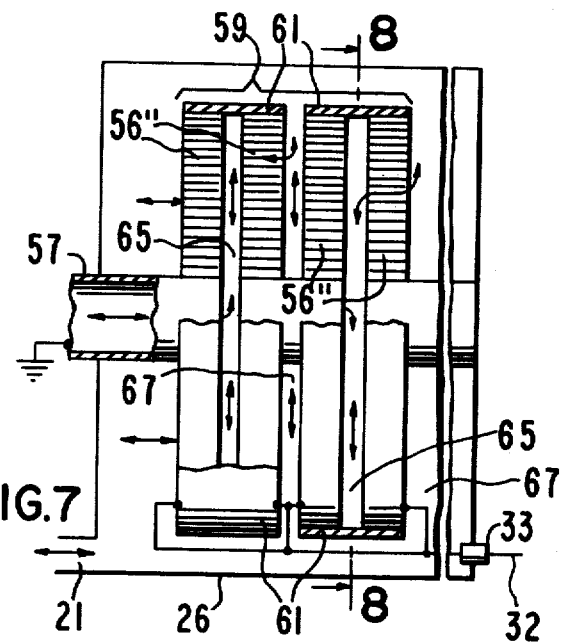
Figure 8:
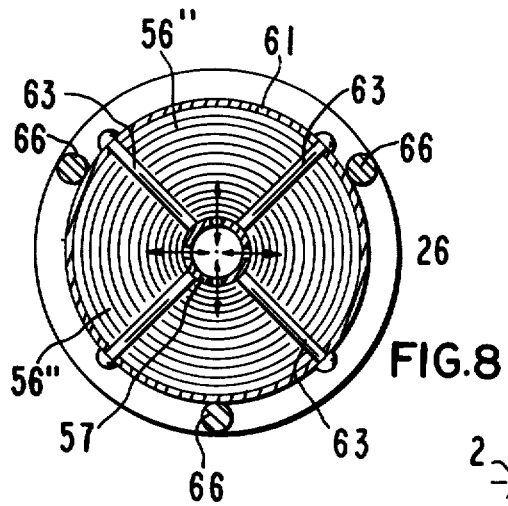

Referring now to FIG. 7, there is shown a segmented double spiral electrode structure 59 of the present invention. A double spiral electrode structure 56 of the type shown in FIG. 5 is segmented into a number of relatively short axial lengths 56'', as of 0.200 inch, which are axially spaced apart by a relatively short space as of 0.050 inch. The spiral segments 56'' are grouped in pairs and each pair is surrounded by a ring 61. The spacing between the spiral elements 56'' of each pair is obtained by a spoke-shaped insulative structure 63 extending in from the rings 61 and terminating short of the tube 57, see FIG. 8. The spoke structure provides support without impeding radial flow of fluid. Alternatively, a radially corrugated insulative annular disk may replace the spokes 63.

The central tube 57 is transversely slotted at its intersection 64 with the spaces 65 between the spiral elements 56'' of each pair. The housing 26 is radially spaced from the spiral electrode structure 59. Axial fluid flow is obtained through each spiral element 56'' of each pair toward the space 65 between the spiral elements 56'' of each pair. Three axially directed rods 66 are positioned between the rings 61 and the inside surface of the housing 26 to provide additional support for the composite structure 59. This segmented double spiral embodiment provides higher flow capacity than the comparable spiral embodiments of FIGS. 5 and 6. If the fluid flow is reversed, i.e., from inside out, the support spokes 63 are placed in the spaces 67 between adjacent pairs of spiral elements 56''.

Figure 12:
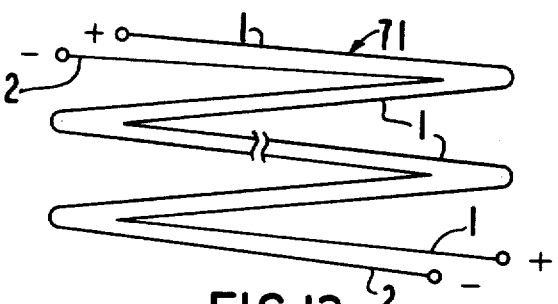
Figure 10:
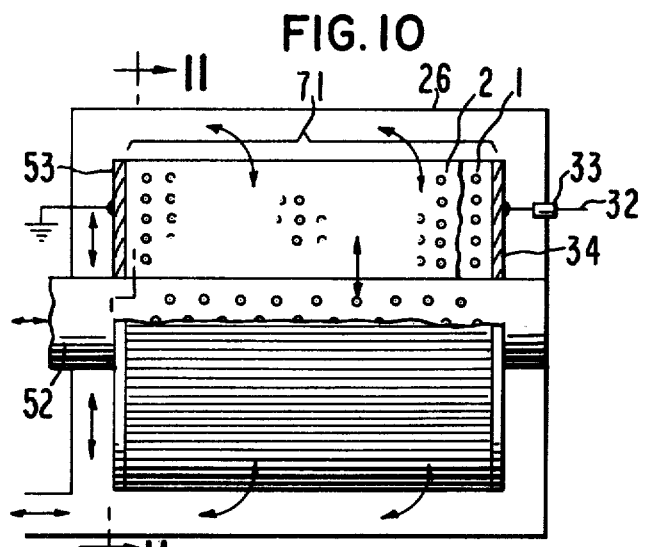
Figure 11:
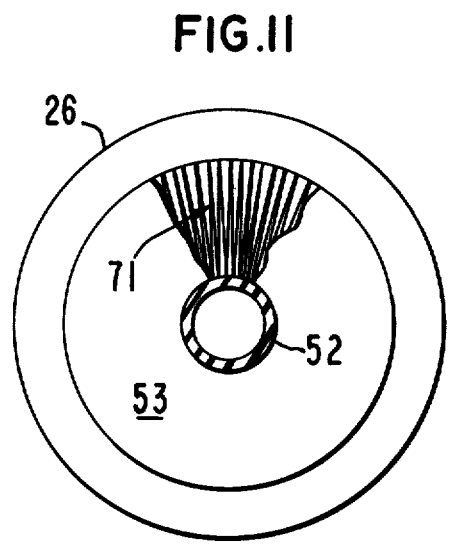

Referring now to FIGS. 10–12, there is shown a pleated composite electrode structure 71 of the present invention. The structure is similar to that of FIG. 4 except that the electrodes 1 and 2, together with their correspnding insulative structure, are folded into pleats which extend for the axial length of the composite structure 71, see FIG. 12. The pleated structure 71 is formed into a cylindrical shape around tube 52 which is coaxial with the long dimension of the pleated folds.

In order to form the pleated structure 71 into a cylindrical shape, the spacing between electrodes 1 and 2 must be less at the inner diameter than at the outer diameter. This difference in spacing may be easily accomplished by corrugating an insulative structure, as in the electrodes of FIGS. 1(j), (k), or one of the electrodes, as in the case of a structure of FIGS. 1(c)–(h), with corrugations which increase in depth taken in a direction away from the axis of the structure.

The meeting ends of the cylindrical unit 71 are cemented together by a suitable adhesive. In certain compressible embodiments, the composite cylindrical unit 71 is radially compressed around the central perforated tube 52 by means of a compression band (not shown) extending around the outer periphery of the cylindrical element 71.

The axial ends of the pleated structure 71 are preferably potted by an insulative potting material to the annular end plates 53 and 54. One electrode 1 is electrically connected to plate 53 and the other electrode 2 is electrically connected to plate 54. Radially directed fluid paths are defined through the spaces between adjacent electrodes 1 and 2 and between adjacent folded portions of the same electrode, see FIG. 12. Therefore, only half of the number of spaces between adjacent electrode portions contains the strong electric field.

However, the effective treating volume of the composite structure which is occupied by a strong electric field can be made nearly 100% by employing relatively thin electrodes 1 and 2 with a relatively wide spacing between the electrodes 1 and 2, such as shown in the structure of FIGS. 1(j) and 1(k). When the thin flat electrodes 1 and 2 are folded back on themselves, the spacing between adjacent portions of the same electrode will be on the order of 1 micron, and are preferably bonded together, whereas the spacing between the electrodes 1 and 2 may be 50 microns or more, especially near the outer periphery of the element 71 where the circumferential spacing between electrodes is larger than at its inner radius.

This enlarged outer spacing is also helpful for providing a graduated type of filter element wherein the larger particles are trapped at the outer regions and the smaller particles are trapped near the inner regions of the filter element. The electrodes 1 and 2, together with the corresponding intervening insulative structure, are preferably perforated in the pleated state to facilitate registration of the perforations in adjacent folded portions of the same electrode 1 or 2.

Figure 13:
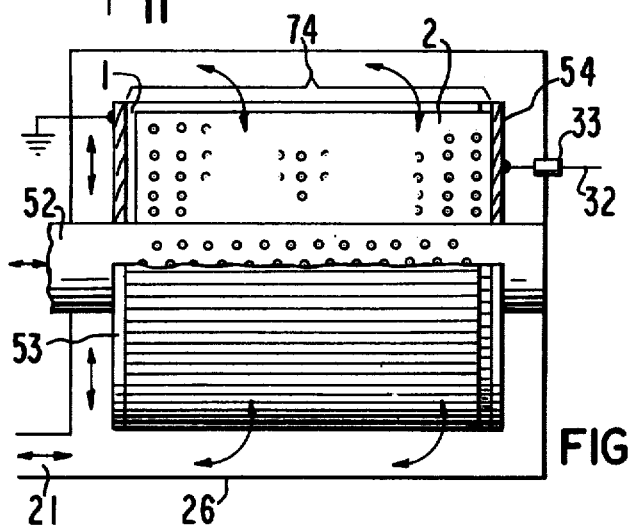
Figure 14:
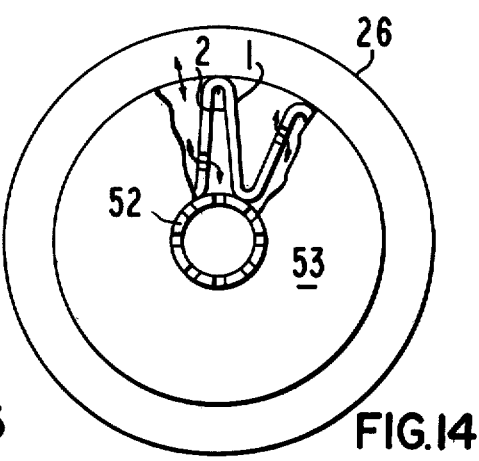

Referring now to FIGS. 13 and 14, there is shown a radially pleated composite electrode structure 74. The structure is essentially the same as shown in FIGS. 10 and 11 except that the electrodes 1 and 2, together with their insulative structure, are folded into pleats which are relatively shallow compared to the relative deep pleats of FIG. 12. The pleated structure is then rolled into a cylinder about the long dimension of the pleats, as shown in the sectional portion of FIG. 14 which is circumferentially expanded for the sake of explanation.

The electrodes 1 and 2 are preferably folded in slightly axially offset relation such that disc 53 may be connected to one edge of electrode 1 and disk 54 connected to one edge of electrode 2. The connection is preferably made by a conductive potting material.

In the pleated structure 74, the electrodes 1 and 2 must be perforated to permit radial fluid flow through the structure. The perforations are preferably not in registration through the electrodes and intervening insulative structure in order to insure that the fluid will flow through the electric fields between the electrodes 1 and 2. The pleated structure 74 of FIGS. 13 and 14 may also be employed for axial flow by substituting element 74 for elements 56, 56′ and 56″ in the structures of FIGS. 5–8.

Figure 15:
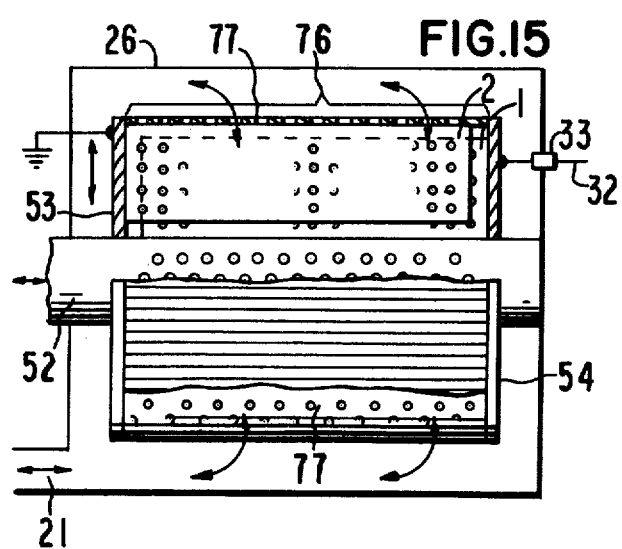
Figure 16:
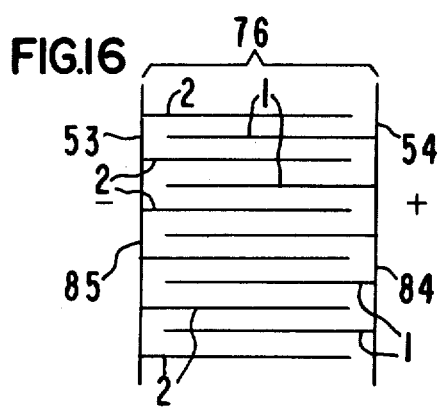

Referring now to FIGS. 15 and 16, there is shown an interdigital composite electrode structure 76 of the present invention. The structure is similar to the pleated structure of FIGS. 10–12 if thin electrodes were employed and adjacent folded portions of the same electrode were squeezed together to form one member. The structure is formed by a stack of interdigitated strip electrodes 1 and 2 with their intervening insulative structures, see FIG. 16. The electrode strips 1 and 2 are axially offset with respect to each other such that electrodes 1 protrude from the stack at one axial end and electrodes 2 protrude from the stack at the other end. The stack is then formed about the long dimension of the electrodes 1 and 2 into a cylinder. As in the case of the pleated structure of FIGS. 10 and 11, the electrodes or intervening insulative structure is preferably corrugated with corrugations which increase in depth toward the outer perimeter of the structure 76. If the structure is readily compressible a compression band 77 may be employed for compressing the structure 76 around tube 52. The axially protruding ends of the stack are conductively potted to disks 53 and 54, respectively. Fluid flows radially through the interdigital structure 76.

The interdigital electrode structure 76 may also be used for axial flow by making electrical connections to the electrodes 1 and 2 along the inner side edges and outer side edges, respectively, and removing the disks 53 and 54. The axial flow structure would be substituted for the electrode structures 56, 56′ and 56″ of FIGS. 5–8. The corrugations, if any, of the electrodes or insulative structure would be directed axially or radially of the structure.

Referring now to FIGS. 17 and 18, there is shown an alternative interdigital composite electrode structure 81 of the present invention. The interdigital electrode structure 81 is formed by an array of generally ring-shaped electrodes 1 and 2 stacked together with their intervening insulative structures in an interdigital manner as indicated in FIG. 16. Electrodes 1 each have a portion removed, along a chord line 82, whereas electrodes 2 have a section removed along a second chord line 83, which is diametrically opposite chord line 82. When the ring electrodes 1 and 2 are stacked, electrodes 1 project from the stack on one side and electrodes 2 project from the stack on the other side. The electrodes 1 are all connected together on one side by a conductor 84 such as a conductive rod, strip of conductive paint or by conductive potting material. The electrodes 2 are all connected together on the other side of the stack by a second conductor 85 in a similar manner to conductor 84. Alternatively, the central holes in the ring-shaped electrodes 1 and 2 may be oppositely offset from their center such that when the rings 1 and 2 are stacked on the central tube 52, rings 1 project from one side and rings 2 project from the other.

Conductors 84 and 85 are connected to disks 54 and 53, respectively. The flow of fluid is in the radial direction and relatively high flow capacity is obtainable.

Alternatively, the interdigital structure 81 of FIGS. 17 and 18 may be obtained by a pleated strip electrode structure, similar to that shown in FIG. 12, with nearly square pleated sections, i.e., nearly as deep as they are long. The pleated structure would be axially apertured either gy periodically punching out a central region of the tape electrodes 1 and 2 and insulative structure before folding or by cutting out an axial bore after folding to receive the tube 52. If corrugated electrodes 1 and 2 and/or insulative structure is employed the corrugations are preferably radially or circumferentially directed with a longer period in the corrugation at the periphery of the element 81 than at the inner diameter.

In such a structure, electrode 1 may be arranged to be exposed along one side of the structure and electrode 2 exposed along the other side of the structure, thereby facilitating electrical connection to the composite electrode structure. The square corners of the rectangular pleated sections could be trimmed before or after folding, if desired, to provide nearly the same cylindrical structure 81 as that obtained by the stacked rings of FIGS. 17 and 18.

Referring now to FIG. 19, there is shown a two wire composite electrode structure 91. The structure is formed by a cylindrical coil structure formed by many overlayed turns of twisted wire electrodes 1 and 2 as shown in FIGS. 1(n), 1(o), and 1(p). Alternatively, the coil structure may be formed by a spiral winding of two wire screen electrodes 1 and 2 with an intervening insulative structure. One electrode 1 is connected to perforated disk 53 and the other electrode 2 is connected to perforated disk 54. The fluid flow is both axial and radial.

Referring now to FIGS. 20 and 21, there is shown a multilayer composite electrode structure 95. The electrodes 1 and 2 are pleated or interdigitated into composite electrode structures, such as 74, 75, 76, 81 or 91, which are relatively shallow in the radial direction to facilitate rolling, if necessary, of the electrode structure around the long dimension of the interdigitated electrodes 1 and 2. This arrangement also permits a graded structure allowing greater spacing between electrodes of the outer structures. The composite element 95 may be made of a plurality of individual shallow cylindrical composite electrode structures 96 concentrically arranged and separated by perforated insulative sheets 97. Alternatively, a shallow composite electrode structure may be rolled into a spiral with a perforated sheet of insulation 97 between adjacent turns of the composite electrode structure 95.

Referring now to FIG. 22, there is shown a method and apparatus for fabricating composite electrode structures of the present invention. More particularly, the machine depicted in FIG. 22 may be employed for fabricating pleated structures of the type shown and described with regard to FIGS. 10–18, 21 and 22. The apparatus will be described as employed for making filter elements out of electrode structures of the type shown in FIG. 1(k). However, the other ones of the various electrode structures of FIGS. 1(a)–1(p) may be employed with slight modification of the method and apparatus of FIG. 22.

A pair of drive rollers 101 are fed from a pair of supply rolls 102 and 103 with two sheets of aluminum foil 1 and 2 as bonded to their backing papers 8 and 9. A corrugator 104, formed by a pair of meshing gears, corrugates an insulative paper web 10 as obtained from supply roll 105 and feeds the corrugated web 10 between the conductive electrodes 1 and 2. A pair of liquid applicators 106 apply adhesive to the ridges of the corrugated web 10. The rollers 101 press the electrodes into contact with the corrugated web 10. A second set of liquid applicators 107 apply adhesive to the outer surfaces of the electrodes 1 and 2.

A holding finger 108 holds the last fold 109 down against the folded stack. A shuttle finger 110, starting from position A as shown in dotted lines, moves to position B, thereby folding the electrode structure. The fingers 108 and 110 are retracted and the folded member is pushed down into a spring loaded retaining structure 111 by a ram 112. The ram is withdrawn and the fingers 108 and 111 return to their starting points to make the next fold.

When making pleated electrode structures wherein the pleats are relatively shallow in the radial dimension, as shown in FIGS. 10 and 11, it may be desired to corrugate the web 10 with corrugations which increase in amplitude in a direction radiating away from the center of the composite element. Accordingly, corrugator 104 has meshing teeth which increase in height taken in the direction across the web 10 from the inside toward the outside, of the composite structure, see FIG. 23. The thickness of the web 10 as corrugated should have the same ratio of inside thickness $t_1$ to the outside thickness $t_2$ as the inside diameter $d_1$ has to the outside diameter of the composite structure to be formed, see FIG. 24. When this condition is satisfied the folded electrode structure coils around the long dimension of the pleats, as shown in FIG. 25. Alternatively, if web 10 is a porous flat sheet of web material it may be crushed to the cross sectional shape as depicted in FIG. 24 to facilitate coiling of the electrode structure. Once the retaining structure 111 is full, upon completion of one unit, the electrode structure is severed and pushed axially out of the retaining structure 111.

If the pleated electrode structure is to be rolled around an axis into the paper in FIG. 22, the retaining structure 111 will be curved as shown by the dotted lines of FIG. 22 and the web 10 should be crushed to have a thinner cross sectional dimension at the inner radius as shown by FIG. 26. The web 10 may be crushed to the proper shape by a press 113 shown in dotted lines which crushes the web 10 after each fold is made and before it is pushed into the folded stack.

When the apparatus of FIG. 22 is employed for making linear interdigital electrode structures, such as that shown in FIGS. 17 and 18, punch and die sets 116 and 117 are provided for repetitively punching a certain pattern in the electrodes 1 and 2 and the intervening web 10. The pattern includes a central hole 115, see FIG. 27, in each of the webs 1, 2 and 10 such that, upon folding, the holes will all be in coaxial alignment to define a central axial bore, which may substitute for the tube 52 or contain the tube 52, as desired. The punched pattern may also have scalloped edges 118, as shown in FIG. 28, such that when the structure is folded along fold lines 119 the resulting structure will be more cylindrical, as shown in FIG. 18.

Also, the corrugation of the web 10, in the linear interdigital structure, is preferably radial or circumferential relative to the central hole 115. When a substantial percentage of the particles to be trapped are not charged, then it is desirable that the channels, defined by the corrugations 121 of the web 10, be circumferential and broken by periodic circumferentially and radially offset passageways 122, as shown in FIG. 29, such that the fluid flows in a zig-zag path with a mean radial direction. The broken corrugation 121, transversely directed to the mean flow direction, may also be employed for the embodiments of FIGS. 4, 10, 13, 15, 17 and 20.

In several of the electrode structures, it is desirable that the insulative web 10 be wider than either one of the electrodes such that the insulative web 10 projects over the exposed edges of the electrodes 1 and 2 to protect the electrodes against shorting by abrasion and the like (see FIG. 28). Composite electrode structures which may employ this feature to advantage include the structures of FIGS. 4, 5, 6, 7, 10, 13, 15 17 and 20.

In certain of the aforedescribed composite electrode structures, it is desirable to make one electrical connection to one side of the composite structure and to make the other electrical connection to the opposite side of the structure. This is facilitated by folding, winding or stacking the sheets as shown in FIG. 30. Electrode 1 projects from one side, electrode 2 from the other and insulative web 10 projects over the electrode to be hidden on each side, thereby protecting same while permitting access to all the electrode portions to be connected together.

Electrical contact to the opposite side edges of the composite electrode structure of FIG. 30 is preferably made by means of a pair of contactor grid structures 120, such as wires, rods or screens, of conductive material such as metal or carbon. Such contactor grids 120 are shown in plan view in FIG. 9. In the case of relatively resistive sheet electrodes 1 and 2, such as conductive paper, conductive webs, or sheets of carbon impregnated ceramic, conductive strips 130 are preferably formed on the sheet electrodes, 1 and 2, such as along the edge to be electrically contacted, for assuring electrical contact between the grid 120 and the sheet electrodes 1 and 2. Alternatively, current and potential can be applied to the sheet electrodes from the ends thereof via strips 130 running the length of the sheets 1 and 2.

The conductive strips 130 have an electrical conductivity much higher than that of the sheet electrode on which they are disposed such that the conductive strip forms essentially an equipotential strip for applying an operating current and potential to the composite electrode structure.

The advantage to the use of resistive sheet electrodes 1 and 2, at least one of which is relatively resistive, i.e., has a surface and bulk resistivity substantially greater than that of an equal sized aluminum electrode, is that the effect of an electrical short between electrodes 1 and 2, in the electrical treatment or electrofilter region, is localized rather than shorting out the entire electric field region of the filter or fluid treating unit. The resistance to be incorporated in the electrode structure for localizing shorts may comprise resistors printed onto the sheet electrode structure in series with the current flow path between contactor grids 120. Such resistors may bridge between the contactor strip and separate printed electrode portions. The shorting current is kept at a small value, in the resistive sheet embodiment, due to the fact that the shorting current must flow through the entire width of the resistive sheets 1 and 2. Thus, the applied potential from the contactor grids 120 is dropped in the sheet electrodes. So long as the resistance of the sheet electrodes 1 and 2 is high compared to the resistance of the current limiting resistor 6 or source impedance the potential across the contactor grids 130 remains high. The shorting current flows from one equipotential strip 130 to the short and thence to the opposed equipotential strip 130. The potential between the electrodes 1 and 2 is only reduced in the immediate vicinity of the short. Thus, the efficiency of the filter remains substantially unimpaired.

The composite electrode structures of the electrofilter may also be employed for drying moisture laden fluids passing through the filter. The drying function may be accomplished, in one embodiment, separately of the filtering function or, in another embodiment, integral of the filtering function. In the embodiment where the drying is separate from the filtering, the porous sheet electrodes 1 and 2 are coated or impregnated with a suitable hygroscopic material which when it absorbs water from the fluid becomes an electrolyte through which an electrical current is passed for liberating elemental oxygen and hydrogen. The liberated gas passes into the fluid stream and is carried away, thereby drying the stream and the electrode. Suitable electrolyte hygroscopic materials include $H_3PO_4$, KOH and NaOH, as disclosed in U.S. Pat. No. 2,816,067.

The electrical drying current is passed through each of the electrodes in the manner as shown in FIG. 30. More particularly, additional conductive strips A and B are placed on sheet electrodes 1 and 2, respectively, along the marginal side edges each opposite the contacting strips 130. Strips A and B are grounded as to the center of the source of potential 5 such that the drying current flows in the same direction across the width and in the plane of each electrode 1 and 2. Thus, the potential difference between the electrodes 1 and 2 at any given place remains essentially at V volts and is essentially uniform over the opposed electrodes. The electric field E in the treatment region between the electrodes 1 and 2 may be uniform or non-uniform, as desired, by use of electrically uniform or non-uniform electrodes, as previously described.

In the alternative embodiment where the drying function is integral with the electrical treating function, either the insulator web 10 or both the insulator web 10 and the electrodes 1 and 2 are coated or impregnated with the hygroscopic electrolytic material. As the moisture is collected, the conductivity of the element on which it is collected is increased to provide increased current flow therethrough for drying the moisture. As the moisture is dried, the electrode or insulator returns to the conductivity of its dry state. The normal filtering or electrical treating action is retained so long as the electrodes are considerably more conductive than the insulator. This condition is obtained by controlling the hygroscopic and conductive material loading of the respective elements.

This method of drying is useful when relatively small amounts of water are to be removed from the fluid stream, i.e., in parts per million. It is also a moisture measuring device as a measure of the current yields a value which is directly proportional to the moisture content of the fluid. A control of the drying current controls the moisture content of the dried fluid.

Referring now to FIG. 31, there is shown a method for fabricating the composite electrode structure 59 of FIG. 7. Wide strip electrodes 1 and 2, together with their insulative structures 10, are wound in a spiral over a tubular mandrel, not shown. The electrodes 1 and 2, together with their insulative webs 10, are cut according to a certain pattern. The portions of the pattern are identified with the same reference number as the portion of the composite structure 59 which is produced when the multi-turn spiral is completed. Adhesive is applied between the sheet electrodes and insulative structure to form a rigid self-supporting electrode structure 59. The overlapping edge feature may be employed such that electrical connection to electrode 1 is made at one axial end and connection to electrode 2 made at the other axial end of the spiral structure. The corrugations in the insulative web 10 may also be axially spaced and circumferentially directed. Gaps would be provided through the corrugations at circumferentially and axially offset positions to provide a zig-zag axial path of fluid flow, if desired, in a manner similar to that described with regard to FIG. 29.

Referring now to FIG. 32, there is shown an alternative folded electrode structure of the present invention. The various folded and interdigital embodiments may be folded out of an electrode structure having a center electrode 2 sandwiched between a pair of outer electrodes 1 and insulative structures 10. This embodiment provides greater shielding for the central electrode 2. Electrical connection may be readily obtained to electrode 2 by having its side edge, which is either into or out of the paper in FIG. 32, protrude over the marginal edge of electrodes 1 and the insulative webs 10. If the overhanging edge technique is employed, as shown in FIG. 30, the electrode structure to be folded may comprise many layers of alternating electrode and insulative structure. If, instead of folding the electrode structure, sections of it are punched out and stacked to form the composite structure, then the electrode structure to be punched, sheared, etc. may comprise a multilayered stack of alternating electrode and insulative sheet material.

Referring now to FIG. 33, there is shown an apparatus for fabricating bifilar helical electrode structures of the type shown in FIG. 4. A supply roll 131 of conductive foil supplies a strip of aluminum foil 1, as of 1 inch wide and 0.001 inch thick, to a pair of conical rollers 132 which roll the foil 1 into a helical shape. The foil is preferably perforated by a perforator, not shown.

The perforated electrode 1 is then coated by an applicator 133 with a coating 134 of an expandable plastic foam material, as shown in FIG. 34 at 133. The foam material is applied in a liquid binder which evaporates leaving a thin uniform coating 134 of the resin on the electrode 1. The foam material will expand to several times the thickness of the coating, upon heating to elevated temperatures in an oven 135, to provide a relatively thick open pore foam structure 136 between adjacent electrodes 1 and 2, as shown in FIG. 37.

A second supply roll 137 supplies a second strip of aluminum foil 2 to a second set of conical rollers 138 which roll the second foil 2 into a helical shape coaxial with the first electrode 1 and twisted together with the first electrode 1. A second applicator 139 coats the second electrode 2 with the foam coating 134.

The two helices 1 and 2 are then pushed together into a stack 141 and fed into the oven 135 which heats the structure 141 to a temperature for expanding and setting the foam coatings 134. The foam material is selected and processed by heating to produce the desired open pore size and strength. In one embodiment, the supply rolls 131, 137, rollers 132 and 138, and applicators 133 and 139 revolve around the axis of the helix 141 which moves in the axial direction through the oven 135.

The expanded open-cell foam 136, as of polyurethane, serves to space the electrodes 1 and 2 and to bond the composite helix structure into a rigid self-supporting structure. The foam may bond to the foils 1 and 2 and/or it may permeate the perforations in the foil electrodes 1 and 2 to form a strong structural unit resistant to fluid channeling. The open-cell expanded foam 136 forms a fluid porous web between the electrodes for mechanically trapping particles to be removed in the labyrinth of fluid channels through the structure.

The foam material need not be applied as a uniform coating 134 but may be applied, as by printing or spraying through a suitable mask, in a desired pattern. More particularly, a pattern of foam coating material may be formed on the electrodes 1 and 2 with an array of circumferentially directed broken lines as shown at 142 in FIG. 34. Alternatively, a pattern of radial lines 142' of foam coating material may be formed on the electrodes 1 and 2, as shown in FIG. 34. Alternatively, the electrodes may be corrugated to define the radial or circumferential flow patterns. When the coating 142 or 142' is heated it expands to provide an array of support webs 143, defining an array of fluid channels 143 through the electrode structure. The webs 143 serve to space the electrodes 1 and 2, to provide structural strength and, if desired, they may also provide the electrical insulation between the electrodes 1 and 2. In the embodiments using line or spot patterns of foam coating material 142, the pores in the foam need not be open to permit fluid flow therethrough.

The use of an expandable foam material between electrodes 1 and 2 is applicable in general to the various other electrode structures and composite electrode geometries, previously described herein, for providing the space between the electrodes 1 and 2. It is especially applicable to those circular embodiments wherein the spacing between electrodes increases from the inside diameter to the outside diameter of the composite electrode structure. It permits these structures to be easily rolled into their circular shapes and, then, the foam is expanded in place to provide the proper spacing and to form a rigid self-supporting structure.

Although the apparatus of FIG. 33 was described as employing aluminum foil electrodes 1 and 2 conductive paper foil electrodes 1 and 2 may also be used. Also, the apparatus of FIG. 33 may be employed for forming helix structures employing porous paper as the insulative support structure. The paper may be previously formed on the electrodes 1 and 2 and applicators 133 and 139 employed for applying an adhesive pattern or coating for bonding the composite structure together. Two strips of paper insulation could be wound into the bifilar helix by two additional supply rolls and roller assemblies similar to those of 131, 137, 132 and 138, respectively, not shown. Alternatively, the paper strips could be fed into the rollers with electrodes 1 and 2.

Referring now to FIG. 38, there is shown an alternative embodiment of the present invention. The composite electrode structure is essentially the same as those previously described herein except that the second electrode 2' is a floating electrode structure disposed in charge distribution inducing relationship with the first electrode 1 which is electrically separated into two portions 1A and 1B overlaying opposite ends of the floating electrode structure 2'. The potential source 5 is connected across the first and second halves 1A or 1B of the first electrode structure with the positive side of the source 5 connected to 1A and the negative side of the source connected to 1B. This applied potential induces an electrical charge distribution of opposite sign in the floating electrode to produce an electric field E in the fluid treatment or filter region between the floating electrode 2' and the adjacent respective half of the first electrode 1. The advantage of the composite electrode structure of FIG. 38 is that the probability of producing an electrical short between the electrode halves 1A and 1B is substantially reduced since electrode halves 1A and 1B can be widely spaced from each other and two insulative gaps must break down in series to produce a short between the electrode halves 1A and 1B through the floating electrode.

Moreover, in a preferred embodiment the floating electrode 2' is separated into a multitude of electrically isolated segments, each segment extending between electrode halves 1A and 1B but being electrically isolated from each other. Then by making the floating electrodes 2' resistive and/or either or both halves 1A and 1B resistive, the effect of an electrical short may be localized, as aforedescribed.

Several features of the present invention may be combined to advantage to provide efficient and inexpensive fluid treating electrode structures. The use of conductive foil in the form of metal foils or conductive paper foils permits forming of electrode structures in an especially convenient manner with an economical use of material. The close electrode spacing which is made economical by the use of foil electrodes, allows intense electric fields to be obtained in the treatment spaces between the interleaved foils by application of only relatively low voltages. Porous web electrode structures or a porous web between foils permits mechanical trapping of particles for certain filter applications. Bonding the interleaved foils to the intervening structure permits a rigid self-supporting electrode structure. Impregnating the electrodes and/or the insulator web with a hygroscopic electrolyte allows drying of the fluid. Use of a floating electrode reduces the possibility of electrically shorting the electrode, whereas making the electrodes of a resistive material localizes the effect of shorts.

Although the electrical treating electrode structures have been described employing relatively close electrode spacings and low voltages of 6–12 volts for filter applications, proportionately higher spacings and voltages may be employed. For example, in household application it may be desirable to apply 110 volts between electrodes 1 and 2. A 4 micron coating of anodizing on an aluminum electrode will easily hold off 110 volts without breakdown of the insulation. If desired 500 volts may be applied between electrodes 1 and 2 spaced by a gap of about 10 microns between thin insulative coatings to break down air in the gap between the insulated electrodes.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrical fluid treating apparatus for treating non-electrolytic fluids, first and second electrode means spaced apart to define at least a portion of a composite electrode structure having an electrical treatment region through which a stream of non-electrolytic fluid is to pass for treatment, insulator means for insulating said first electrode from said second electrode to permit an electrical field to be established between said electrodes in said treatment region, resistive means incorporated in at least one of said electrode means in such a manner that, in the presence of an electrical short between said electrodes through the non-electrolytic fluid to be treated in said treatment region, said resistive means drops the applied potential across said resistive means in a localized portion of said resistive electrode structure such that less than one-tenth of said treatment region is effectively shorted by said electrical short.

2. The apparatus of claim 1 including, contactor electrode means for contacting opposite sides of said composite electrode structure such that a short between said electrodes causes the shorting current to flow from one contactor electrode means to the other contactor electrode means through said resistive electrode from one side edge of the composite electrode structure to the opposing side edge of said composite electrode structure.

3. The apparatus of claim 1 wherein each of said first and second electrodes is sheet shaped and disposed with their broad sides in mutually opposed relation.

4. The apparatus of claim 3 including, contactor grid means disposed for making electrical contact to a side edge of at least one of said sheet shaped electrodes and being pervious to fluid flow therethrough into said electrical treatment region between the mutually opposed broad sides of said first and second electrodes.

5. The apparatus of claim 3 wherein said sheet shaped electrodes each comprise a web of insulative material coated with an electrically conductive material.

6. The apparatus of claim 3 wherein said sheet shaped electrodes are made of conductive paper.

7. The apparatus of claim 1 wherein said first and second electrodes are made of refractory material.

8. The apparatus of claim 7 wherein said refractory material is selected from the class consisting of ceramic, asbestos, carbon, glass and quartz.

9. The apparatus of claim 3 wherein each of said sheet shape first and second electrodes is perforated with a multitude of perforations to facilitate fluid flow therethrough.

10. The apparatus of claim 3 wherein at least one of said sheet shaped first and second electrodes is corrugated with the mean peak-to-peak depth of said corrugations being greater than one-fourth of the mean spacing between said first and second sheet electrodes, and each corrugations being arranged relative to the opposed electrode surface such as to produce a substantial non-uniform electric field between opposed electrode surfaces.

11. The apparatus of claim 7 wherein said refractory material includes a carbon impregnated ceramic.

12. The apparatus of claim 3 including a strip of electrically conductive material disposed on at least one of said sheet shaped electrodes to render said strip portion of said electrode more electrically conductive than the adjacent regions of said sheet shaped electrode to facilitate making of electrical contact to said sheet shaped electrode.

13. The apparatus of claim 12 wherein said strip of electrically conductive material is disposed along at least one marginal side edge of said sheet shaped electrode.

14. The apparatus of claim 12 wherein said strip of electrically conductive material comprises a strip of carbon.

15. The apparatus of claim 9 wherein said perforations have a mean minor lateral dimension in the plane of said sheet electrode which is greater than one-fourth of the mean spacing between the opposed sheet electrodes.

16. The apparatus of claim 1 wherein said insulator means includes a sheet of insulative material interposed between said first and second sheet electrodes.

17. The apparatus of claim 16 wherein said sheet of insulative material is perforated.

18. The apparatus of claim 3 wherein said insulator means includes a fibrous web of insulative material interposed in the space between said first and second sheet electrodes.

19. The apparatus of claim 16 wherein said sheet of insulative material includes a sheet of paper.

20. The apparatus of claim 16 wherein said sheet of insulative material is refractory and selected from the class consisting of ceramic, glass, asbestos, and quartz.

21. The apparatus of claim 3 wherein said sheet shaped electrodes each comprise a web of insulative material coated with a conductive material selected from the class consisting of metallic salts, conductive polymers, carbon, and metals.

22. The apparatus of claim 1 including, third floating electrode means interposed between said first and second electrode means in spaced relation therefrom to define at least one fluid passageway therebetween, said third electrode means being disposed in electrically insulative and in change inducing relationship with said first and second electrode means such that an electrical potential applied across said first and second electrode means induces a charge distribution in said floating electrode means of opposite polarity to the charge distribution produced in said first and second electrode means in response to the applied potential, whereby an electrical treating field is produced in said fluid passageway between said third floating electrode means and at least one of said first and second electrode means.

23. The apparatus of claim 22 wherein said floating electrode means includes a plurality of floating electrode portions electrically isolated from each other.

24. The apparatus of claim 22 including second resistive means incorporated in said floating electrode means in such a manner that an electrical short between said floating electrode means and one of said other electrode means in said treatment region serves to drop the applied potential across said second resistive means such that less than one-tenth of said treatment region is effectively shorted by said short.

25. The apparatus of claim 22 wherein said first, second and third electrodes are made of an electrically conductive fibrous web.

26. In an electrical fluid treating apparatus for treating non-electrolytic fluids, means forming first and second electrodes spaced apart to permit a stream of non-electrolytic fluid to pass therebetween, means forming an insulative structure disposed in the space between said electrodes to permit a voltage to be established between said electrodes, the improvement wherein, said first and second electrodes are sheets of conductive paper interleaved with said insulative structure to form a composite electrode structure.

27. The apparatus of claim 26 wherein said first paper sheet conductive electrode includes a sheet of aluminum foil supported upon a paper web.

28. In an electrofilter apparatus for removing particulate contaminates from an electrically resistive fluid, first and second sheet shaped electrodes spaced apart with their broad sides in mutually opposed relation to define a composite electrode structure having an electrical filtering region through which a stream of fluid is to pass for electric filter treatment, insulator means interposed in the space between said mutually opposed broad sides of said electrodes for insulatively supporting said first and second sheet electrodes from each other in spaced relation and to permit an electric field to be established between said electrodes in said treatment region, at least one of said sheet shaped electrodes being electrically non-uniform such as to produce a substantial non-uniformity in the electric field intensity established in said filter treatment region between said electrodes.

29. The apparatus of claim 28 wherein said electrical non-uniformity of said electrode comprises a substantial variation in the spacing between the mutually opposed broad sides of said first and second electrodes, whereby a substantial non-uniformity in the electric field intensity is produced in the electric filter treatment region.

30. The apparatus of claim 36 wherein said variation in the spacing between said first and second electrodes comprises a corrugation of said electrically non-uniform electrode with the peak-to-peak amplitude of the corrugation of said sheet electrode being greater than one-quarter of the mean spacing between said first and second electrodes.

31. The apparatus of claim 28 wherein said non-uniformity of said electrode comprises a repetitive discontinuity of said electrode structure in the plane of the sheet electrode such as to produce a substantial non-uniformity in the electric field intensity in the electric filter treatment region.

32. The apparatus of claim 31 wherein said discontinuity of said electrode structure comprises a periodic discontinuous pattern of said electrode, said periodic pattern having mean lateral dimensions in the plane of said sheet electrode sufficiently large such as to produce a substantial non-uniformity of the electric field in the electric treatment region between said sheet electrodes.

33. The apparatus of claim 28 wherein said insulative means includes a web of insulative material.

34. The apparatus of claim 33 wherein said web of insulative material includes a sheet of insulative paper.

35. The apparatus of claim 28 wherein said insulator means includes a sheet of insulative material interposed between said first and second electrode with each of its broad sides facing a broad side of said electrodes.

36. The apparatus of claim 35 wherein said insulator means includes a coating of insulative material coating one of said sheet members.

37. The apparatus of claim 28 wherein said non-uniform electrode includes a porous web structure at the surface thereof adjacent the electric filtering region for trapping particulate contaminants forced toward said non-uniform electrode.

38. The apparatus of claim 28 wherein said non-uniform electrode comprises an electrically conductive porous fibrous web.

39. The apparatus of claim 28 wherein said non-uniform electrode includes a sheet of conductive paper.

40. In an electrofilter apparatus for removing particulate contaminates from an electrically resistive fluid, first and second sheet shaped electrodes disposed in spaced apart relation with their broad sides in mutually opposed relation to define a composite electrode structure having an electric filtering region through which a stream of fluid is to pass for electric filter treatment, insulator means for insulatively supporting said first and second sheet electrodes in spaced relation and to permit an electrical field to be established between said electrodes in said treatment region, at least one of said sheet shaped electrodes being perforated according to a certain pattern of perforations, said perforations of said pattern being sufficiently large such as to produce a substantial non-uniformity of the electric field in the electric field treatment region between said sheet electrodes.

41. The apparatus of claim 1 wherein, said first and second electrode means comprise filamentary conductive electrodes intertwined to define a composite electrode structure having an electrical treating region defined by the space between said intertwined electrode means and through which a stream of fluid is to pass for electrical treatment.

42. The apparatus of claim 41 wherein said first and second filamentary electrode means are twisted together.

43. In a method for electrically treating a fluid stream the steps of:
spacing apart first and second electrode structures to define a composite electrode structure having an electrical treatment region through which a stream of dielectric fluid is to be passed for treatment;
insulating said first and second electrode structures to permit an electrical field to be established between said electrodes in said treatment region;
applying an electrical potential across said first and second electrodes for establishing an electrical field in the treatment region;
incorporating electrical resistance in at least one of said electrode structures in such a manner that, in the presence of an electrical short between said electrodes through the dielectric fluid to be treated in said treatment region, said electrical resistance drops the applied potential across said resistance in a localized portion of said electrode structure such that less than 1/10th of said treatment region is effectively shorted by said electrical short.

44. The method of claim 43 wherein said first and second electrode structures are sheet-shaped and disposed with their broad sides in mutually opposed relation, and including the step of corrugating at least one of said sheet-shaped first and second electrode structures with a mean peak-to-peak depth of said corrugations being greater than ¼ of the mean spacing between said first and second sheet electrode structures, such corrugations being arranged relative to the opposed electrode surface such as to produce a substantial non-uniform electric field between opposed electrode surfaces.

* * * * *